US008418203B1

(12) United States Patent
Nishio et al.

(10) Patent No.: US 8,418,203 B1
(45) Date of Patent: Apr. 9, 2013

(54) TRANSMISSION METHOD AND RECEIVING DEVICE OF PROGRAM GUIDE INFORMATION INCLUDING A CONTROL SIGNAL

(75) Inventors: Fumihiko Nishio, Tokyo (JP); Keiji Yuzawa, Saitama (JP); Takashi Tsurumoto, Saitama (JP); Yasuaki Yamagishi, Kanagawa (JP); Eiji Yoshida, Kanagawa (JP); Yoshihisa Gonno, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/807,804

(22) PCT Filed: Aug. 18, 2000

(86) PCT No.: PCT/JP00/05558
§ 371 (c)(1),
(2), (4) Date: Sep. 14, 2001

(87) PCT Pub. No.: WO01/15444
PCT Pub. Date: Mar. 1, 2001

(30) Foreign Application Priority Data

Aug. 19, 1999 (JP) .................................. 11-233245
Aug. 19, 1999 (JP) .................................. 11-233246
Aug. 19, 1999 (JP) .................................. 11-233247
Aug. 19, 1999 (JP) .................................. 11-233248
Aug. 19, 1999 (JP) .................................. 11-233249
Aug. 19, 1999 (JP) .................................. 11-233250
Aug. 19, 1999 (JP) .................................. 11-233251

(51) Int. Cl.
*H04N 7/10* (2006.01)

(52) U.S. Cl.
USPC ............................................. 725/42; 725/32

(58) Field of Classification Search ................ 725/32, 725/34–36, 39–61
See application file for complete search history.

(56) References Cited

U.S. PATENT DOCUMENTS

| 5,579,055 A | 11/1996 | Hamilton et al. |
| 5,760,821 A | 6/1998 | Ellis et al. |
| 5,815,145 A * | 9/1998 | Matthews, III .................. 725/41 |

(Continued)

FOREIGN PATENT DOCUMENTS

| EP | 0944 254 A1 | 9/1999 |
| JP | 8-511140 | 11/1996 |

(Continued)

OTHER PUBLICATIONS

Ladebusch U: "Einfuhrung In Den DVB-Datenrundfunk", Femseh Und Kinotechnik, VDE Verlag GmBH. Berlin, DE, vol. 52, No. 7, Jul. 1998 pp. 425-432.

(Continued)

*Primary Examiner* — Farzana Hossain
(74) *Attorney, Agent, or Firm* — Lerner, David, Littenberg, Krumholz & Mentlik, LLP

(57) ABSTRACT

By describing electrical program guide information in a language such as XML and then multiplexing the electrical program guide information to a broadcast signal for transmission, advertisements, images and sounds can be easily entered and various program guides can be realized. For manufacturers of receiving devices, it suffices to develop only the software for receiving, decoding and displaying received XML data. There is no need to develop the software for displaying the EPG for each type of receiving device. Thus, the number of development steps can be reduced.

29 Claims, 41 Drawing Sheets

U.S. PATENT DOCUMENTS

| | | | | |
|---|---|---|---|---|
| 5,841,433 | A * | 11/1998 | Chaney | 725/50 |
| 5,907,323 | A * | 5/1999 | Lawler et al. | 725/41 |
| 5,990,927 | A * | 11/1999 | Hendricks et al. | 725/132 |
| 6,049,831 | A * | 4/2000 | Gardell et al. | 709/236 |
| 6,081,263 | A * | 6/2000 | LeGall et al. | 715/760 |
| 6,201,538 | B1 * | 3/2001 | Wugofski | 715/716 |
| 6,311,329 | B1 * | 10/2001 | Terakado et al. | 725/44 |
| 6,337,719 | B1 * | 1/2002 | Cuccia | 348/731 |
| 6,442,755 | B1 * | 8/2002 | Lemmons et al. | 725/47 |
| 6,578,201 | B1 * | 6/2003 | LaRocca et al. | 725/86 |
| 6,661,468 | B2 * | 12/2003 | Alten et al. | 348/569 |
| 6,675,385 | B1 * | 1/2004 | Wang | 725/39 |
| 6,698,020 | B1 * | 2/2004 | Zigmond et al. | 725/34 |
| 6,820,278 | B1 * | 11/2004 | Ellis | 725/80 |
| 6,895,595 | B2 * | 5/2005 | Goodman et al. | 725/136 |
| 6,990,677 | B1 * | 1/2006 | Pietraszak et al. | 725/49 |
| 2002/0042918 | A1 * | 4/2002 | Townsend et al. | 725/41 |
| 2002/0166120 | A1 * | 11/2002 | Boylan et al. | 725/35 |
| 2002/0199192 | A1 * | 12/2002 | Donnelly | 725/40 |
| 2003/0051243 | A1 * | 3/2003 | Lemmons et al. | 725/44 |
| 2003/0110499 | A1 * | 6/2003 | Knudson et al. | 725/42 |
| 2003/0208756 | A1 * | 11/2003 | Macrae et al. | 725/34 |
| 2004/0081426 | A1 * | 4/2004 | Tsukidate | 386/46 |
| 2004/0194131 | A1 * | 9/2004 | Ellis et al. | 725/34 |
| 2004/0221307 | A1 * | 11/2004 | Arai et al. | 725/44 |
| 2005/0138660 | A1 * | 6/2005 | Boyer et al. | 725/58 |

FOREIGN PATENT DOCUMENTS

| | | |
|---|---|---|
| JP | 8-511140 T | 11/1996 |
| JP | 10-257449 | 9/1998 |
| JP | 10-257449 A | 9/1998 |
| JP | 11-69314 | 3/1999 |
| JP | 11-69316 | 3/1999 |
| JP | 11-069316 A | 3/1999 |
| JP | 11-194943 | 7/1999 |
| JP | 11-194943 A | 7/1999 |
| JP | 11-220703 | 8/1999 |
| JP | 11-220703 A | 8/1999 |
| WO | 99 11066 | 3/1999 |
| WO | 99-11066 A1 | 3/1999 |

OTHER PUBLICATIONS

Eitz G: "Zukunftige Informations-Und Datenangebote Beim Digitalen Femsehen-EPG Und Lesezeichen" Rundfunktechnische Mitteilungen, Mensing. Norderstedt, DE, vol. 41. No. 2, Jun. 1, 1997 pp. 67-72.

Mikihiro Ueno, et al., "A Proposal of Mulltimedia EPG", General Meeting of the Institute of Electronics, Information and Communication Engineers, Japan, 1998, p. 357, full text.

"Data Housou wo Butai ni TV to PC Gyoukai ga Gakitotsu", Nikkei Electronics, Japan, May 31, 1999, No. 744, p. 113-118, full text.

English translation of Japanese Office Action issued Oct. 13, 2009, issued in Japanese Patent Application No. 2001-519037.

Television and PC industry are crashed about data broadcasting, Nikkei Electronics Nikkei BP, May 31, 1999 No. 744, pp. 113-118.

Ueno, et al., Multimedia information EPG and the use, Institute of Electronics, Information and Communication Engineers, 1998 general meeting lecture memoirs, Corporate judicial person Institute of Electronics, Information and Communication Engineers, Mar. 30, 1998, p. 357.

* cited by examiner

DATA BASE     EPG RECEPTION

| TRANSMISSION TIME | CONTROL VALUE |
|---|---|
| PST1 | PEB1 |
| PST2 | PEB2 |
| PST3 | PEB3 |
| ... | ... |
| PSTn | PEBn |

| AI1 | ST1 | ET1 | AN1 | AD1 | AP1 | PA1 | KT11 | KV11 | KT12 | KV12 |
|-----|-----|-----|-----|-----|-----|-----|------|------|------|------|
| AI2 | ST2 | ET2 | AN2 | AD2 | AP2 | PA2 | KT21 | KV21 | KT22 | KV22 |
| ⋮ | ⋮ | ⋮ | ⋮ | ⋮ | ⋮ | ⋮ | ⋮ | ⋮ | ⋮ | ⋮ |
| AIn | STn | ETn | ANn | ADn | APn | PAn | KTn1 | KVn1 | KTn2 | KVn2 |

FIG. 32

| AI | ST | ET | AN | AD | AP | PA | KT1 | KV1 | KT2 | KV2 |
|---|---|---|---|---|---|---|---|---|---|---|
| 1 | 8/1 0:00 | 8/5 0:00 | CARMAKER A | DRIVING ON THE SEASIDE.... | "Car A.png" | 1 | CHANNEL | TELEVISION B (STATION) | — | — |
| 2 | 8/1 0:00 | 8/2 0:00 | RAILROAD C | FOR THE SUMMER VACATION... | "Rail C.mng" | 1 | PROGRAM | FISHING ASIA | PROGRAM | WORLD MARKET |
| 3 | 7/1 0:00 | 8/31 0:00 | SPORTS MAKER D | A DASH... | "Sports.png" | 1 | GENRE | SPORTS, SOCCER | GENRE | SPORTS, BASEBALL |
| 4 | 8/1 0:00 | 8/2 0:00 | COMPUTER MAKER E | HIGH-SPEED ... | "Comp E.png" | 2 | TIME | 8/1 22:00-8/1 23:00 | — | — |
| 5 | 8/1 0:00 | 8/2 0:00 | INFORMATION/ COMMUNICATION MAKER F | BY ONE PUSH.... | "Info F.mng" | 2 | TIME | 8/1 10:00-8/1 12:00 | TIME | 8/1 23:00-8/2 0:00 |
| ⋮ | | | | | | | | | | |

FIG.33

TRANSMISSION METHOD AND RECEIVING DEVICE OF PROGRAM GUIDE INFORMATION INCLUDING A CONTROL SIGNAL

This application is a national stage entry of PCT/JP00/05558 filed Aug. 18, 2000, which claims priority to Japanese Application No. 11-233245 filed Aug. 19, 1999, Japanese Application No. 11-233246 filed Aug. 19, 1999, Japanese Application No. 11-233247 filed Aug. 19, 1999, Japanese Application No. 11-233248 filed Aug. 19, 1999, Japanese Application No. 11-233249 filed Aug. 19, 1999, Japanese Application No. 11-233250 filed Aug. 19, 1999 and Japanese Application No. 11-233251 filed Aug. 19, 1999.

BACKGROUND OF THE INVENTION

This invention relates to a transmission method and a receiving device for an electrical program guide (EPG) which particularly enables easy retrieval of programs broadcast on a number of channels as in a digital television broadcast.

Recently, the CS (communication system) digital broadcast system has been popularly used, in which television signals converted to digital signals are transmitted and the broadcast signals are received at each home for viewing. In such a broadcast system, it is possible to secure, for example, as many as 150 channels and many more programs can be broadcast in comparison with a conventional broadcast with ground waves.

In such a broadcast system, in order to securely select a desired program from a large number of programs, electrical program guide information is transmitted as program information scheduled to be broadcast. This electrical program guide information is received and displayed on the receiving side. Watching this electrical program guide, the user can select a desired program.

In this case, the EPG information is transmitted in the SI (service information) format in conformity with the DVB (digital video broadcast) standard. Every time a request to display EPG information is made by the user of the receiving device, the table of the EPG information is received to display the EPG information on the screen. The EPG information transmitted in the SI format only includes schedule information (name of program, broadcast channel, genre of program, broadcast start time, broadcast end time, explanation of program contents and the like). The receiving device which received the EPG information prepares a display image in accordance with a pre-programmed processing program and displays the display image. Therefore, even if the same EPG information is received, the mode of display of the EPG is different depending on the manufacturer of the receiving device and the type of the receiving device. Although having an advantage that each manufacturer of the receiving device can present its own characteristics, the display mode of the EPG has a problem that the number of software development steps for displaying the EPG has been increasing year by year, making the development time-consuming.

In addition to the CS digital broadcast system, a digital broadcast system using a broadcasting satellite (BS) and a digital broadcast system using ground waves are to be provided in the near future. It is desired that the broadcasts are received by a common receiver for the respective systems rather than a dedicated receiver for a single system. Therefore, it is desirable to provide integrated EPG information that is seamless across the CS broadcast, the BS broadcast and the ground wave broadcast.

SUMMARY OF THE INVENTION

In view of the foregoing status of the art, it is an object of the present invention to provide an EPG that is more convenient and requires fewer development steps.

A transmission method is presented according to the present invention for transmitting program guide information together with video and audio signals. The method comprises the steps of: generating program guide data including a control signal for controlling the display mode at a time when the program guide information is displayed on a display device; and transmitting the generated program guide data together with the video and audio signals.

A receiving device according to the present invention is presented for receiving a broadcast signal such that program guide data including a control signal for controlling the display mode at the time when program guide information is displayed on a display device is transmitted together with video and audio signals. The receiving device comprises: a receiving section for receiving the broadcast signal; an extracting section for extracting the program guide data from the received signal; and a display processing section for carrying out display processing of a program guide on the basis of the control signal included in the extracted program guide data.

BRIEF DESCRIPTION OF THE DRAWINGS

FIG. 32 shows the data format of advertisement data which enables setting of a plurality of conditions to be displayed.

FIG. 33 shows a specific example of advertisement information having the format shown in FIG. 32.

DETAILED DESCRIPTION

Figure 1:
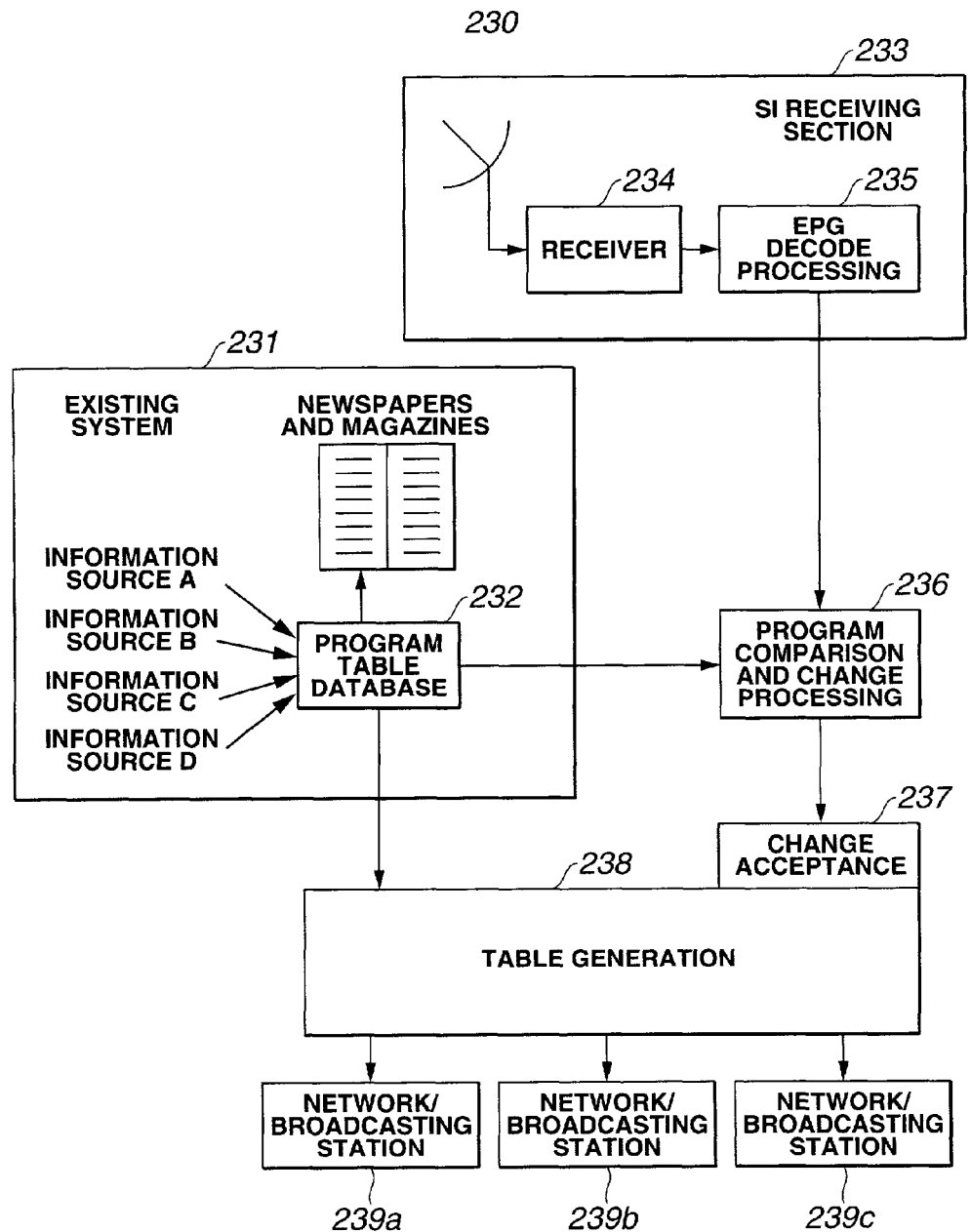
FIG. 1 is a block diagram showing an integrated EPG system as an embodiment of the present invention.

A preferred embodiment of the present invention will now be described with reference to the drawings. In this embodiment, a system for seamlessly transmitting and receiving integrated EPG information is employed as a specific example. However, the present invention is not limited to this embodiment.

First, a seamless EPG system for seamlessly transmitting and receiving integrated EPG information will be described. This seamless EPG system can handle integrated EPG information which is seamless across a CS digital broadcast system and a digital broadcast system using a broadcasting satellite (BS).

In the case where a seamless EPG information providing system is considered, the data quantity of the integrated EPG information is increased, and the data quantity is also increased by the enrichment of service contents. Therefore, it is considered to collectively prepare the integrated EPG information at the time of authoring by using a data broadcast system based on XML (extensible markup language). This provides the advantage that the transmission side (broadcasting station or contents producer) can determine the display design as well as character data and that images and sounds can be entered, while the conventional transmission of the EPG information in the SI table format only enables transmission of data determined by the schedule information as described above. Unlike the SI table format for character data, there is no limitation to the number of characters and non-standard characters. Therefore, EPG information that is more advantageous to the user can be provided. Manufacturers of receiving devices need only develop the software for receiving, decoding and displaying the XML data There is no need to develop the software for displaying the EPG for each type of receiving device. Thus, the number of development steps can be reduced.

With the EPG information in accordance with the XML system (or the contents of program advertisement information) the screen layout and presentation control of program information are described by XML and scripts. The presented information itself is an external object that is referred to from the XML text.

For example, when referring to the EPG information itself from the XML text, a URI (uniform resource identifier) is used. The URI is an extension of the URL (uniform resource locator) used in HTML texts of the Internet.

In order to realize the integrated EPG system, as a matter of course, a program table database is needed on the transmission side. If such a database is to be newly constructed, a large cost is required and data collection therefor is troublesome because of multiple information sources. For example, data is obtained by using a system for preparing the existing television guide or a program page of a newspaper. Since a greater quantity of such information is prepared in comparison with the SI format, more information can be provided for the user by using such information for the EPG of data broadcast.

Originally, the database prepared for the existing newspapers and magazines was not changed quickly in accordance with program changes. Therefore, it was not possible to quickly respond to stepwise program organization for professional baseball, a change to a substitute program because of rain, or a sudden change of programs.

Meanwhile, the SI format is directly managed by the broadcasting station. It employs the system which enables program changes within a few minutes.

The advantages and drawbacks of the SI format and the EPG are summarized as follows. The SI format enables high-speed changes, but only limited information can be sent. The EPG prepared from the existing database enables transmission of more information with more media, but cannot immediately deal with rapid changes.

Thus, a seamless EPG system is constructed by combining these two formats. FIG. 1 shows essential portions of an overall seamless EPG system, which will be described later, and shows the structure for generating and transmitting an integrated EPG.

An existing system 231 is a system for managing television program tables of existing newspapers and magazines. Data are collected from various information sources A, B, C, and D, and stored in a program table database 232. The information sources A, B, C, and D may be broadcasting stations, companies commissioned by broadcasting stations, or program production companies.

The information gathered in the program table database 232 in the existing system 231 is sent to a table generating section 238. In the table generating section 238, a table is generated by using XML. The table thus generated is sent to network enterprises or broadcasting stations 239a, 239b, and 239c which actually carry out data broadcast. To the network/broadcasting stations 239a, 239b, and 239c, the table is sent by each satellite in the case of satellite broadcast, or by each area in the case of ground wave broadcast. On receiving the table, the network/broadcasting stations 239a, 239b, and 239c multiplex the table to broadcast signals and then broadcast the signals. The user can receive the broadcast signals by using a receiving device and can see the program table.

Figure 2A:
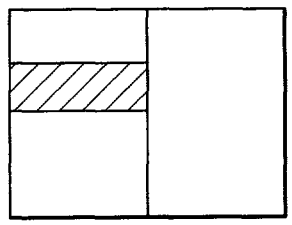
FIGS. 2A and 2B illustrate the preprocessing by a program comparison and change processing section constituting the integrated EPG system.
Figure 2B:
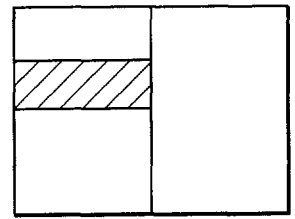
Figure 3:
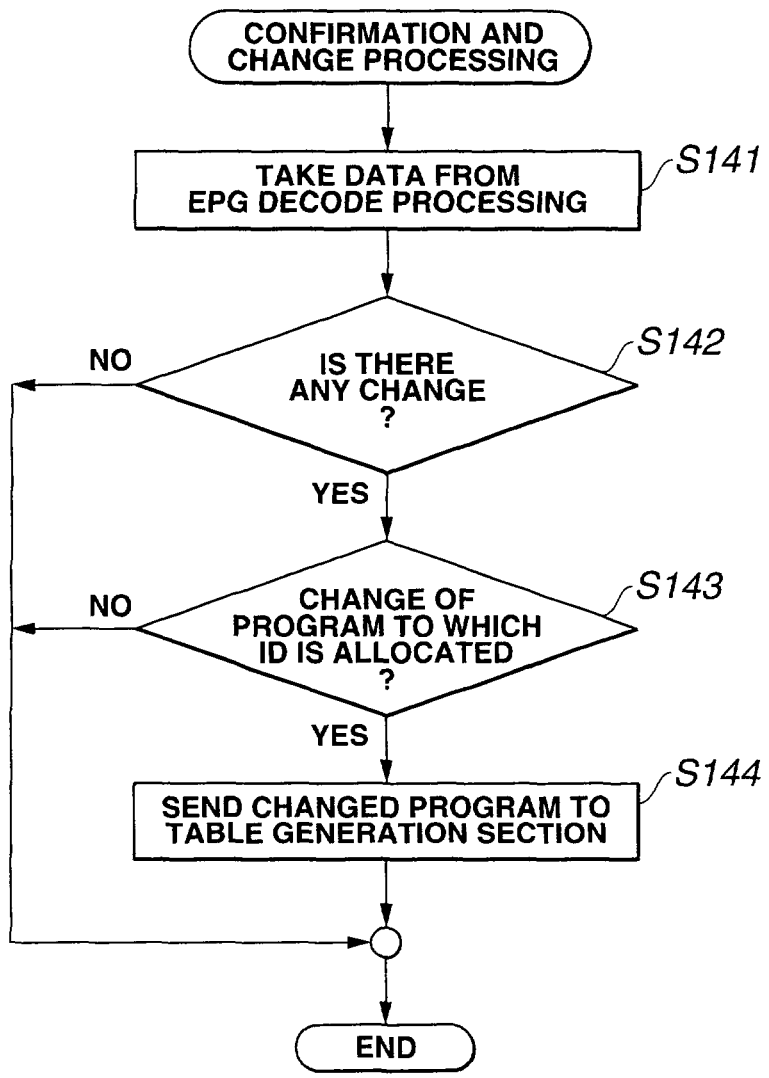
FIG. 3 is a flowchart for explaining the confirmation and change processing by the program comparison and change processing section.

The processing in the case where the EPG of the SI format is changed will now be described. A program comparison and change processing section 236 receives in advance the same data as the data sent to the table generating section 238, from the program table database 232. An SI receiving section 233 receives the EPG sent in the SI format by using a receiver 234, and decodes the EPG by using an EPG decode processing section 235. The EPG in the SI format is directly managed and sent from the broadcasting station. The data received by the SI receiving section 233 and decoded by the EPG decode processing section 235 is sent to the program comparison and change processing section 236. When obtaining information of the SI format from radio waves, if the data can be provided directly from the broadcasting station, the SI receiving section 233 need not receive radio waves. In any case, program information to be changed timely is supplied to the program comparison and change processing section 236. On receiving the data from both the existing system 231 and the SI receiving section 233, the program comparison and change processing section 236 compares two pieces of information shown in FIGS. 2A and 2B, as preprocessing, and allocates IDs to programs having the same title. After that, the program comparison and change processing section 236 executes the processing shown in FIG. 3 so as to confirm whether there is no change in the data from the SI receiving section 233.

Specifically, at step S141, data is taken from the EPG decode processing section 235. If it is determined at step S142 that there is a change and it is determined at step S143 that the ID is allocated to the program of the changed portion, the information of the changed program is sent to the table generating section 238 via a change accepting section 237, at step S144. The table generating section 238 preferentially processes the information supplied from the change accepting section 237, then generates a table based on that information, and provides the table to the network/broadcasting stations 239a, 239b, and 239c. On receiving the table from the table generating section 238, the network/broadcasting stations 239a, 239b, and 239c immediately transmit the table as radio waves. Thus, the user can be quickly notified of the change.

Figure 4:
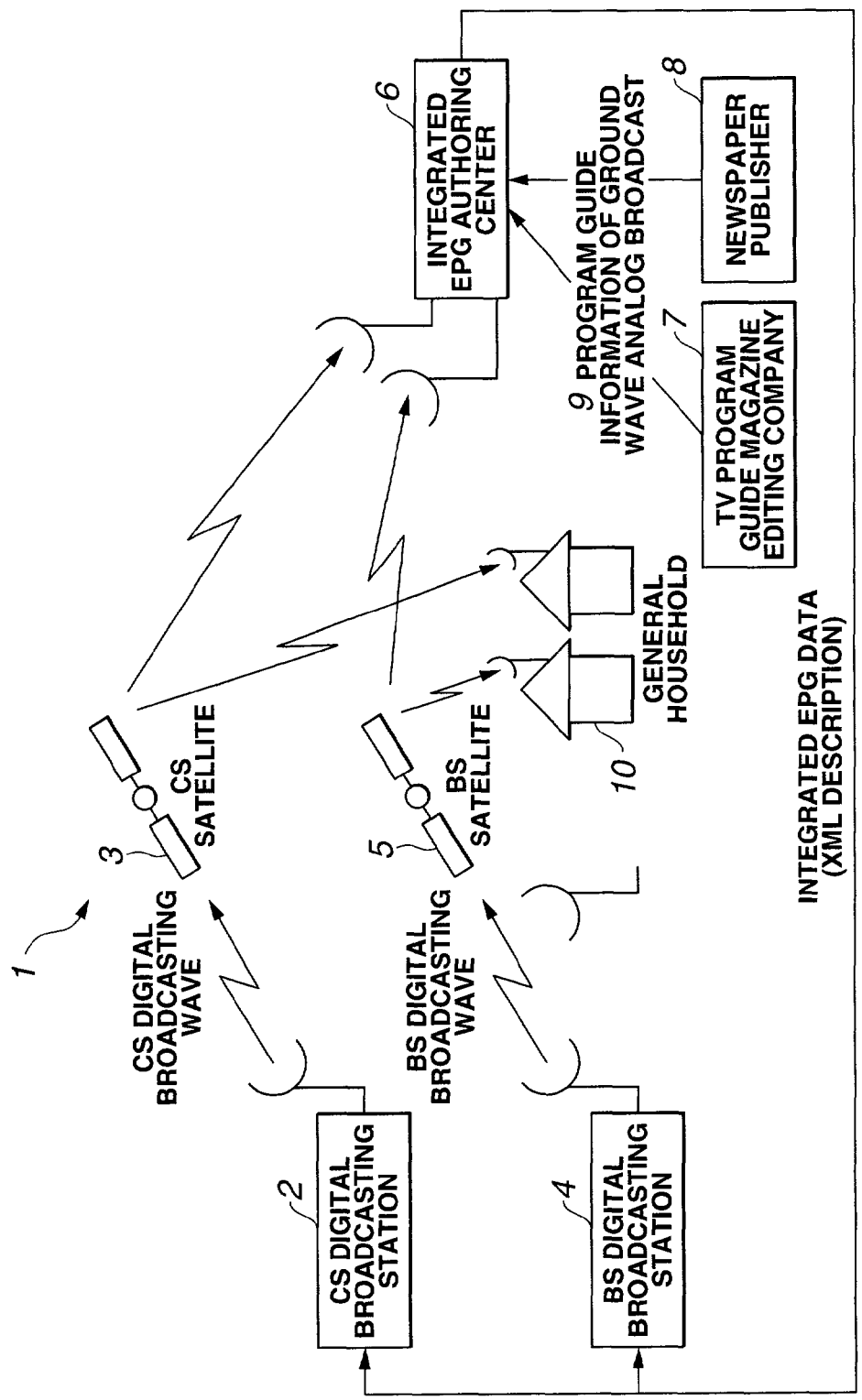
FIG. 4 is a block diagram showing the overall structure of a seamless EPG system.

FIG. 4 shows the overall structure of a seamless EPG system 1. Signals from a CS digital broadcasting station 2 and a BS digital broadcasting station 4 are received by an integrated EPG authoring center 6 via a CS satellite 3 and a BS satellite 5, respectively. The integrated EPG authoring center 6 receives both the BS and CS broadcast signals and also receives EPG data 9 of ground wave television broadcast from a television program guide magazine editing company 7 or a newspaper publisher 8. The integrated EPG authoring center 6 extracts EPG data transmitted as a part of SI information from the broadcast signals received from the CS satellite 3 and the BS satellite 5, as will be described later. Then, the integrated EPG authoring center 6 generates integrated EPG data described in XML on the basis of the extracted EPG data of the CS and BS digital broadcast and the EPG data of the ground wave analog television broadcast 9. The integrated EPG data thus generated is transmitted to the CS digital broadcasting station 2 and the BS digital broadcasting station 4, then multiplexed to their respective broadcast signals, and transmitted. Therefore, in the broadcast signals from the CS satellite 3 and the BS satellite 5, the integrated EPG data is multiplexed in addition to the EPG data as a part of the SI information. Thus, if a general household 10 has a receiving device for either CS digital broadcast or BS digital broadcast, the user can view the integrated EPG. Although the integrated EPG authoring center 6 obtains the EPG data of CS digital broadcast or BS digital broadcast by receiving the broadcast signals from the satellite 3 or 5, it may also receive the EPG data from the CS digital broadcasting station 2 or the BS digital broadcasting station 4 via a dedicated ground cable.

Figure 5:
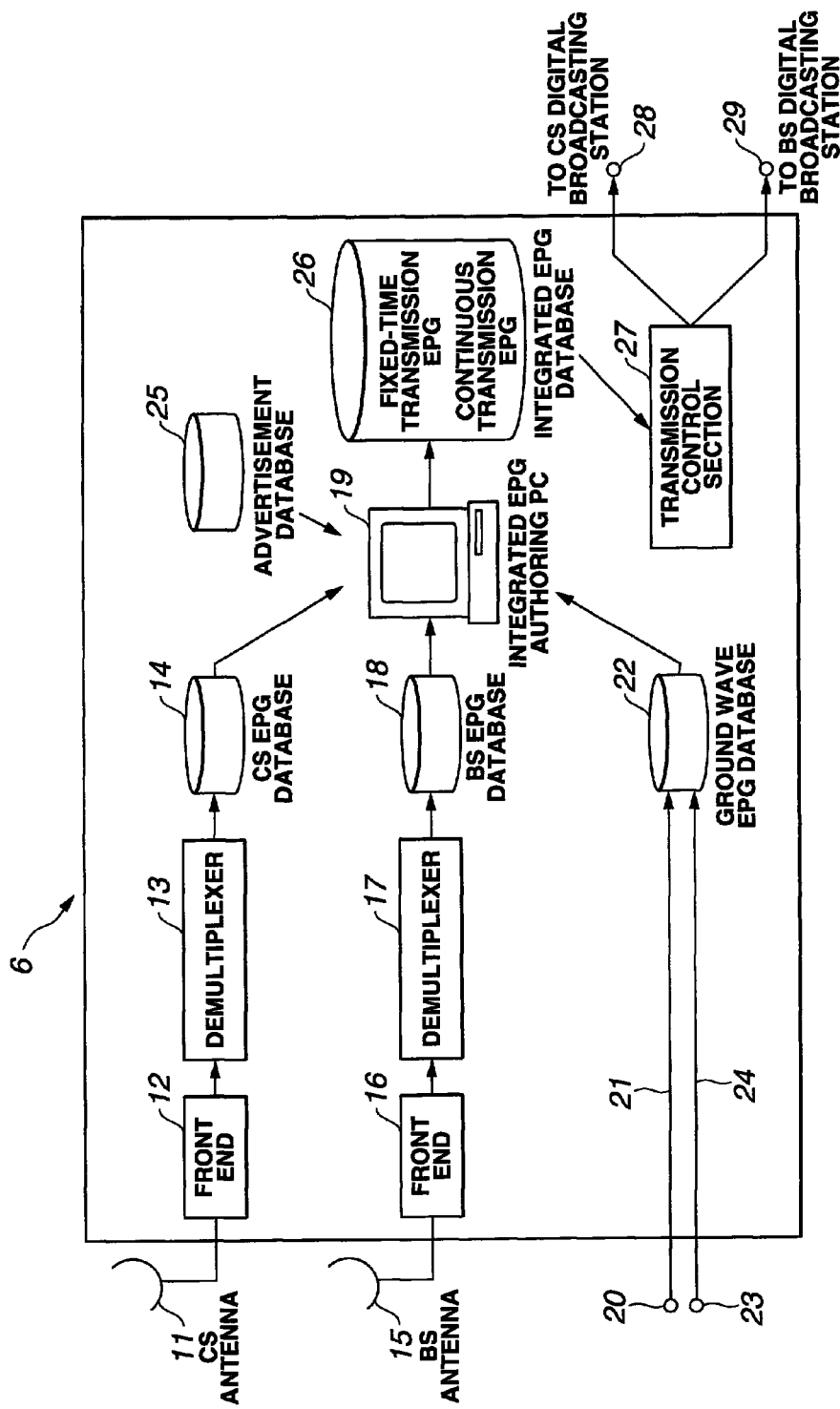
FIG. 5 is a block diagram showing the structure of an integrated authoring center in the seamless EPG system.

FIG. 5 shows the structure of the integrated EPG authoring center 6. In the integrated EPG authoring center 6, two systems of receiving facilities for CS digital broadcast and BS digital broadcast are provided, including front ends 12, 16, each being constituted by a tuner, a demodulation circuit and an error correction circuit, demultiplexers 13, 17 for extracting the EPG data transmitted as a part of the SI information from transport streams outputted from the front ends 12, 16, and EPG databases 14, 18 for storing the extracted EPG data, respectively.

There is also a database 22 for EPG data 21, 24 of ground wave analog television broadcast transmitted from a newspaper publisher or a television program guide magazine editing company via input terminals 20, 23.

Moreover, an advertisement database 25 is provided in which advertisement information (static images, explanatory texts and the like) is stored.

With reference to these four databases 14, 18, 22 and 25, an integrated EPG authoring PC 19 prepares integrated EPG contents described in XML. The prepared EPG contents are classified into EPG data for fixed-time transmission and EPG data for continuous transmission and then stored into an integrated EPG database 26. The EPG data stored in the integrated EPG database 26 is transmitted to the BS and CS digital broadcasting stations via a transmission control section 27.

The reason for classifying the EPG contents into EPG data for fixed-time transmission and EPG data for continuous transmission will now be described. As described above, in the case where the seamless EPG information providing system is considered, the data quantity of the integrated EPG information is increased, and the data quantity is also increased by the enrichment of service content. To transmit such a large quantity of EPG data, a large bandwidth is required. However, since the EPG data is basically additional data, it is impossible to secure a large bandwidth for such additional data. Sending a large quantity of data within a narrow bandwith is time-consuming. Thus, in the integrated EPG system of the present invention, all the EPG data is transmitted several times a day using a relatively broad band, and in the case where there is a change in the EPG data transmitted at a fixed time, the changed data is transmitted continuously in a narrow band as differential information. On the receiving side, the EPG data transmitted at a fixed time is received and stored into a storage device (memory, hard disk or the like) provided in the receiver. When the continuously transmitted differential information is received, the EPG data already stored in the storage device is updated by using the received differential information.

Figure 6:
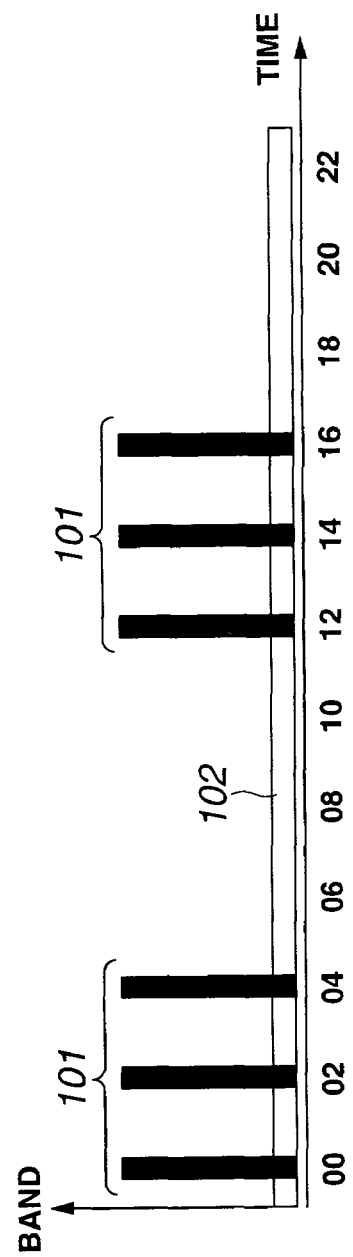
FIG. 6 shows an example of transmission and application of EPG data for fixed-time transmission and EPG data for continuous transmission.

FIG. 6 shows an example of transmission and application of EPG data for fixed-time transmission and EPG data for continuous transmission.

For example, an application in which the program schedule and contents information are transmitted as the contents of the EPG data is described hereinafter. At fixed times every day, three times in the morning and three times in the afternoon, all the program schedule and contents information of broadcast in the morning and the program schedule and contents information of broadcast from the afternoon to the night (101) are to be transmitted. (This is referred to as routine information transmission.) Along with these fixed-time transmissions, differential update information (102) in the case where there is a change of contents or the like from the already transmitted information 101 is to be continuously transmitted. (This is referred to as differential update information transmission.)

Figure 7:
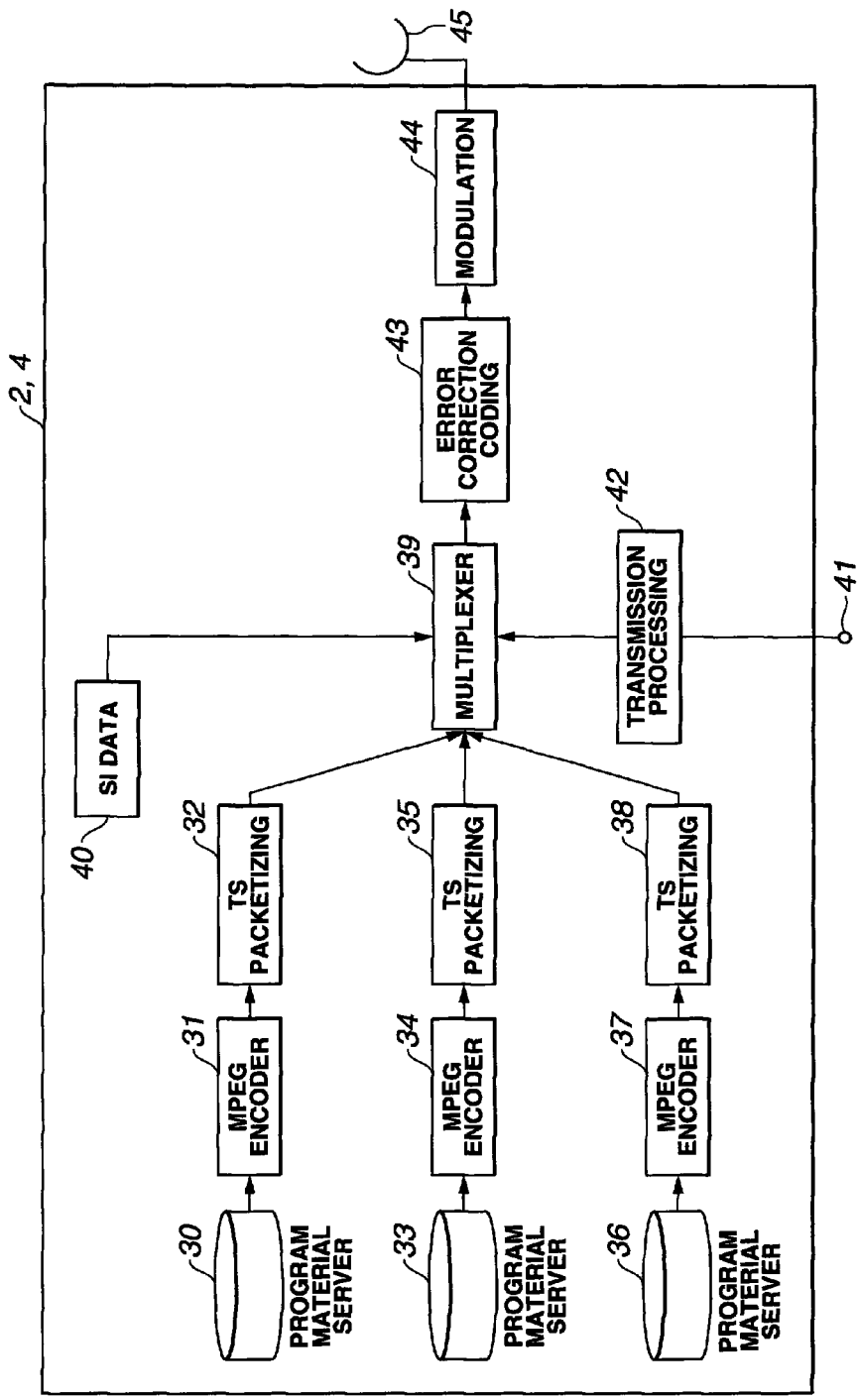
FIG. 7 is a block diagram showing the structure of a CS/BS digital broadcasting station in the seamless EPG system.

FIG. 7 shows the structure of the CS or BS digital broadcasting station 2 or 4. The CS or BS digital broadcasting station 2 or 4 has program material servers 30, 33, 36 for storing video and audio data to be materials of programs, MPEG encoders 31, 34, 37 for compression-coding the video and audio data from the program material servers in accordance with MPEG, and TS packetizing sections 32, 35, 38 for packetizing the data compressed by the MPEG encoders into transport packets. The CS or BS digital broadcasting station 2 or 4 also has a multiplexer 39 for multiplexing transport streams outputted from the plurality of TS packetizing sections 32, 35, 38. The multiplexer 39 is also supplied with the SI information including the EPG data, which is multiplexed together with the transport streams from the TS packetizing sections 32, 35, 38.

Moreover, the EPG data transmitted from the integrated EPG authoring center 6 is supplied to a transmission processing section 42 via an input terminal 41. The transmission processing section 42 performs processing in conformity with a protocol called DSM-CC (digital storage media-command and control). The transmission processing section 42 also performs transmission processing in accordance with a data carousel system prescribed by the DSM-CC.

The integrated EPG data, on which transmission processing is thus performed, is supplied to the multiplexer and multiplexed together with the video, audio and SI information. The data output from the multiplexer 39, after generation and addition of an error correction code by an error correction coding circuit 43, is modulated by the modulator 44 in accordance with a predetermined modulation system and then transmitted from an antenna 45.

Figure 8:
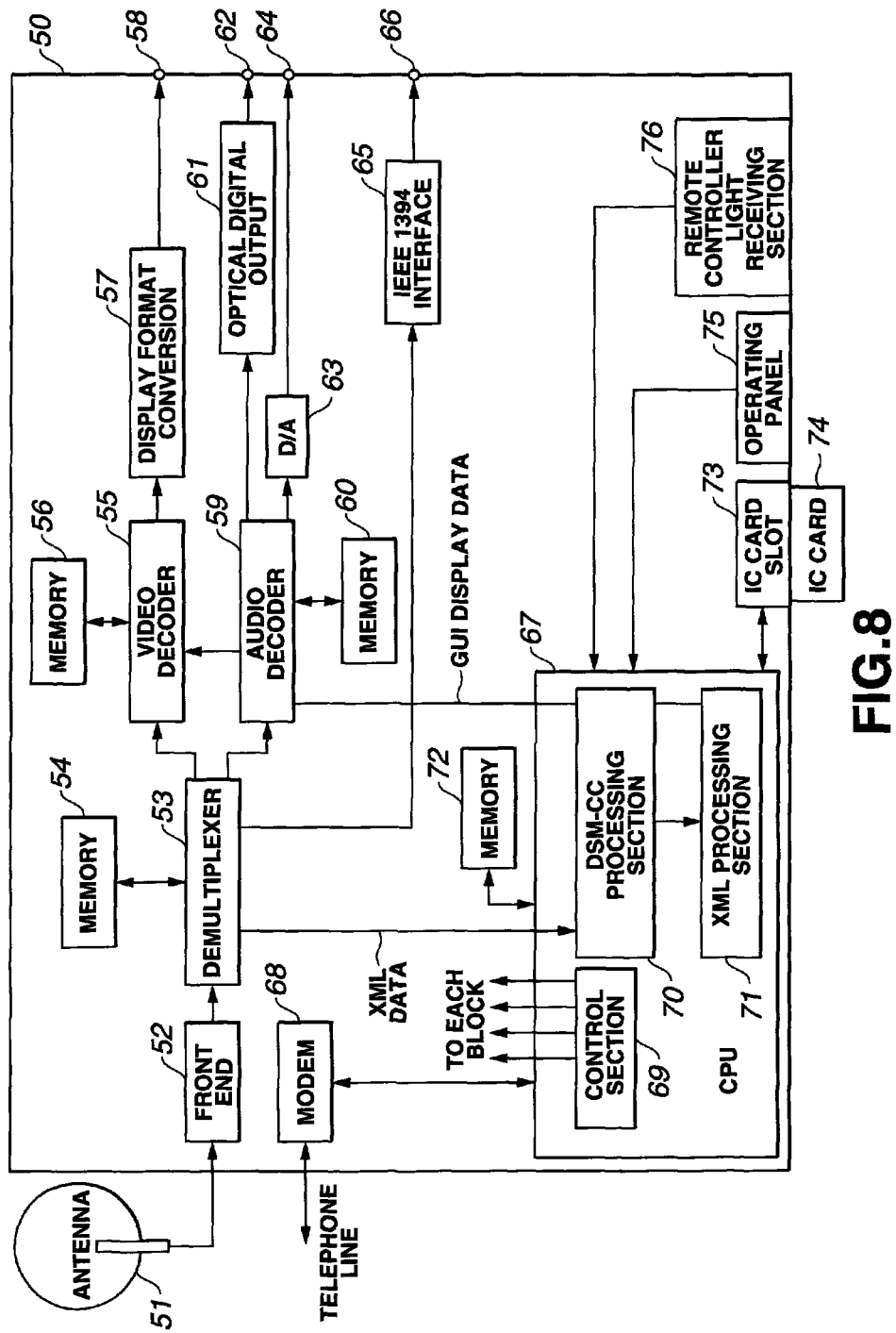
FIG. 8 is a block, diagram showing the structure of a BS or CS receiving device installed in a general household.

FIG. 8 shows the structure of a BS or CS receiving device installed in the general household 10. A BS or CS receiving device 50 has an antenna 51, a front end 52 constituted by a tuner, a demodulation circuit and an error correction circuit, and a demultiplexer 53 for allocating each transport packet to each section with reference to a PID (packet ID) of transport streams output from the front end 52. The demultiplexer 53 temporarily stores the received data into a memory 54 connected thereto. The demultiplexer 53 then sequentially reads out from the memory 54 the transport packets storing video data and audio data of a program selected by the user, and supplies the video data and audio data to a video decoder 55 and an audio decoder 59, respectively. In the case where EPG data transmitted at a fixed time or continuously transmitted EPG data is included in the received signals, the demultiplexer 53 extracts the EPG data and stores it via a CPU 67 to a memory 72 connected to the CPU 67.

The video decoder 55 carries out decode processing in accordance with the MPEG2 format and outputs the decoded video data to a display format converting section 57. The display format converting section 57 performs conversion processing on the video data so as to enable display suitable for the television display format. For example, in the case where the decoded video data is an HDTV signal and the television is NTSC-compatible, the display format converting section 57 converts the decoded video data to the NTSC format and then sends it to an output terminal 58.

The audio decoder 59 carries out decode processing of the audio data compressed in accordance with the MPEG audio or AAC (advanced audio coding) system. The decoded audio data is digital to analog (D/A) converted and output as an analog audio signal, or the digital audio data is output as an optical digital output.

The demultiplexer 53 is connected with an IEEE 1394 interface 65, which enables output of the received transport stream to external equipment via an output terminal 66 and reception of a transport stream from external equipment.

Each section of the receiver is controlled by the CPU 67. The CPU 67 is constituted by a control section 69 for controlling each section, a DSM-CC processing section 70, and an XML processing section 71. All the processing of these sections is carried out through software.

The DSM-CC processing section 70 reads out the EPG data from the memory 72 connected to the CPU 67, then performs predetermined processing on the EPG data so as to obtain data in the XML format, and outputs the data to the XML processing section 71.

The XML processing section 71 executes the script included in XML and generates a display signal for on-screen display. The display signal generated by the XML processing section 71 is sent to the video decoder 55 and an ultimate display signal is obtained by using a display processing function within the video decoder 55. For example, the image of a currently received channel is displayed on a sub-screen at a part of an EPG screen described in XML.

A system for transmitting and receiving the differential update information which is described in the application of FIG. 6 (transmission/reception system for differential update information) will now be described.

In updating the EPG information sent by broadcast waves, which is already stored in the receiving device, it is necessary to replace either the whole table in which updating occurred, or to rewrite only the portion where updating occurred. Although the method of replacing the whole table is simple and reliable, portions having no change are also broadcast and updated and therefore the computational resources on the receiver side are used for unnecessary reception and processing. In the conventional method of rewriting only the portion where update occurred, the description of the updating procedure is not for general purposes and it cannot be applied to the updating of a table stored in a generally used database or the like. Moreover, it is not possible to efficiently filter only the differential update in the table related to the portion in which the end user is interested. Thus, a technique for enabling the receiving device to efficiently filter only the portion where updating occurred with respect to the contents in which the user is interested, will be described here.

Figure 9:
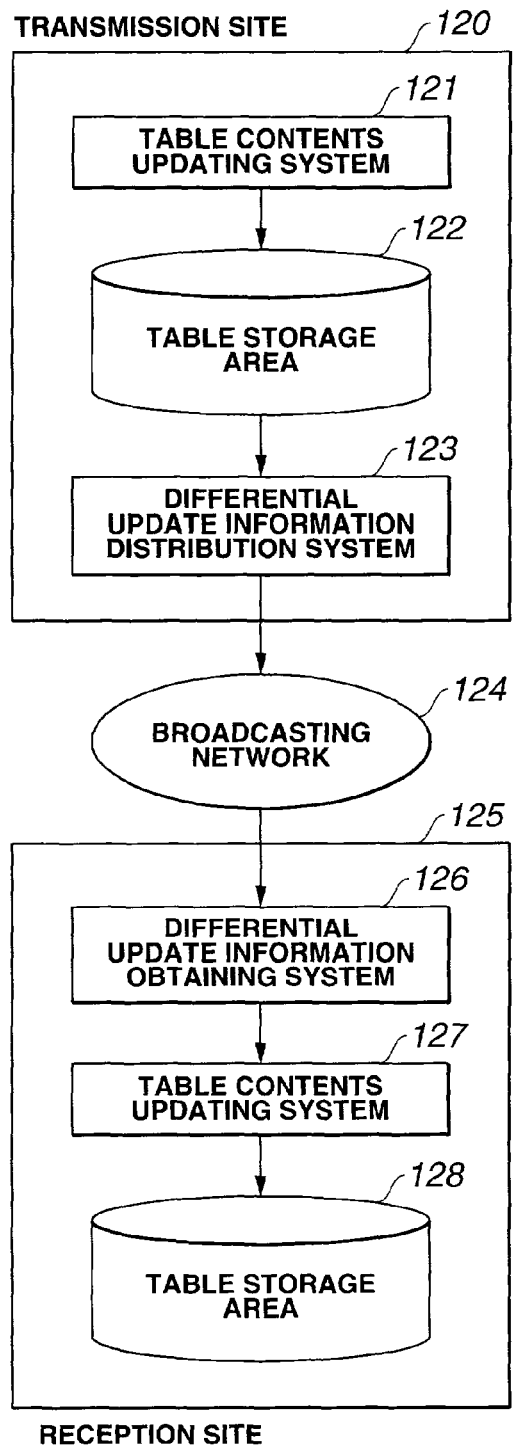
FIG. 9 shows the structure of a differential update information system as a specific example of the present invention.

FIG. 9 shows the structure of the differential update information transmission/reception system. A transmission site 120 and a plurality of reception sites 125 are connected via a broadcasting network 124. The broadcasting network 124 is a system for carrying out broadcast data transfer and may employ various network forms such as a satellite broadcasting system, a ground wave broadcasting system, and a broadcast/multi-cast network on the Internet.

The transmission site 120 may employ various forms such as a broadcasting equipment, a PC, and an in-transmission-site network (in-station network) having a broadcasting equipment and a PC connected by a network. In the specific example shown in FIG. 4, the integrated EPG authoring center 6 has this function.

The reception site 125 may employ various forms such as a set top box, a PC, and an equipment in an in-reception-site network (home network) having a set top box and a PC connected by a network. In the specific example shown in FIG. 4, the reception site 125 is installed in the general household 10.

A table contents updating system 121 in the transmission site 120 is adapted for updating the contents of EPG information and therefore updates the contents of a table stored in a table storage area 122. The update is carried out by the end user or an application in the transmission site. The integrated EPG authoring PC 19 shown in FIG. 5 has this function.

The table storage area 122 is a table storage area in the transmission site 120. The table storage area 122 is a memory or a hard disk in the transmission site 120, or a storage equipment (memory, hard disk, tape device or the like) connected to the in-transmission-site network in the case where the transmission site 120 is constituted by the in-transmission-site network. In FIG. 5, the integrated EPG database 26 has this function.

A differential update information distribution system 123 is a system for detecting a change in the contents of the table stored in the table storage area 122 (including generation and erasure of the whole table), generating differential update information to reflect the change to table storage areas 128 in the reception sites 125, as will be described later, and then broadcasting the differential update information to differential update information obtaining systems 126 in the plurality of reception sites 125 via the broadcasting network 124. In FIG. 5, the transmission control section 27 has this function.

The table storage area 128 is a table storage area in the reception site 125. The table storage area 128 is a memory or a hard disk in the reception site 125, or a storage equipment (memory, hard disk, tape device or the like) connected to the in-reception-site network in the case where the reception site 125 is constituted by the in-reception-site network. In FIG. 8, the memory 72 has this function.

The differential update information obtaining system 126 is a system for obtaining differential update information that is broadcast thereto. In FIG. 8, the front end 52, the demultiplexer 53, the memory 54 and the CPU 67 have this function. A table contents updating system 127 is a system for updating the contents of the table stored in the table storage area 128 on the basis of the differential update information sent from the differential update information obtaining system 126. In FIG. 8, the CPU 67 has this function.

The reception site 125 is a specific example of the program information receiving device of the present invention. That is, the differential update information obtaining system 126 selectively takes out a differential update information notification format, which will be described later, transmitted from the transmission site 120. The table contents updating system 127 rewrites only a changed portion of program information that is transmitted at a fixed time in advance by using the differential update information notification format selectively taken out by the differential update information obtaining system 126.

Figure 10:
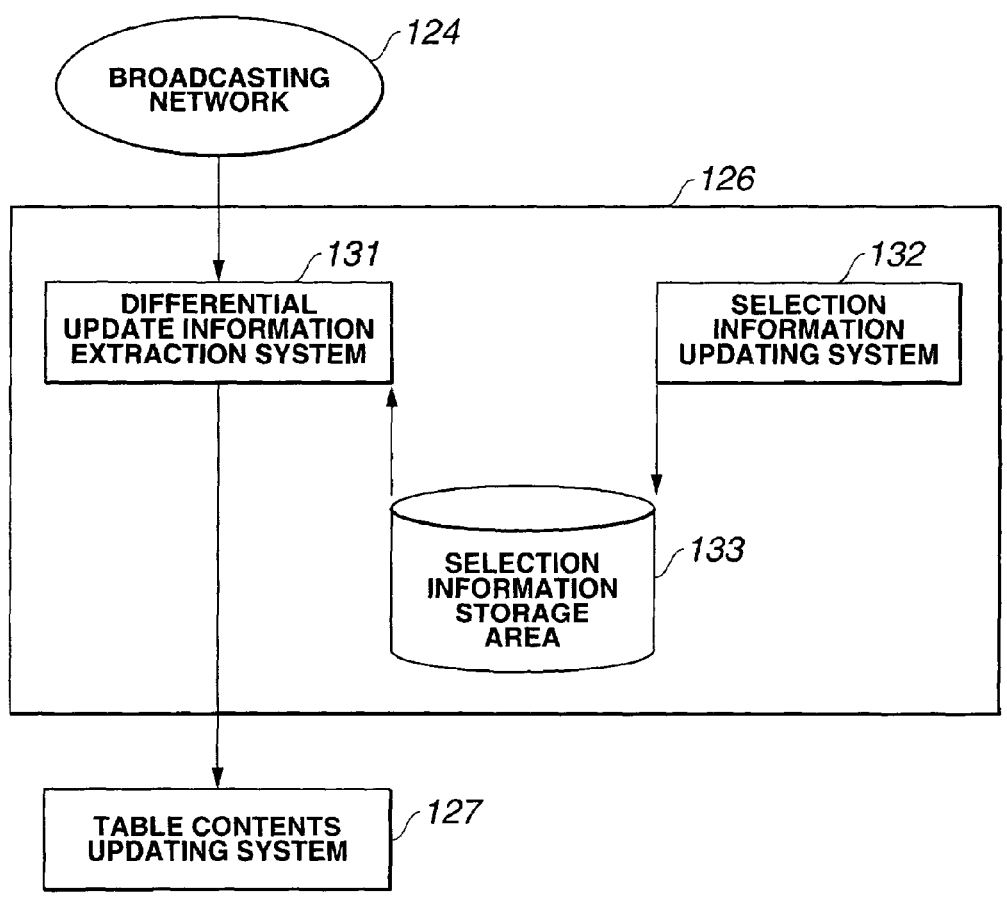
FIG. 10 is a block diagram showing a differential update obtaining system constituting the differential update information system.

FIG. 10 shows the details of the differential update information obtaining system 126. The differential update information obtaining system 126 is constituted by a differential update information extraction system 131, a selection information updating system 132, and a selection information storage area 133. The differential update information extraction system 131 is a system for receiving the differential update information broadcast from the broadcasting network 124 and extracting the differential update information required by this reception site 125 on the basis of selection information stored in the selection information storage area 133. The selection information updating system 132 is a system for updating the selection information in the selection information storage area 133. The update of the selection information is carried out by the end user or an application in the reception site.

Figure 11:
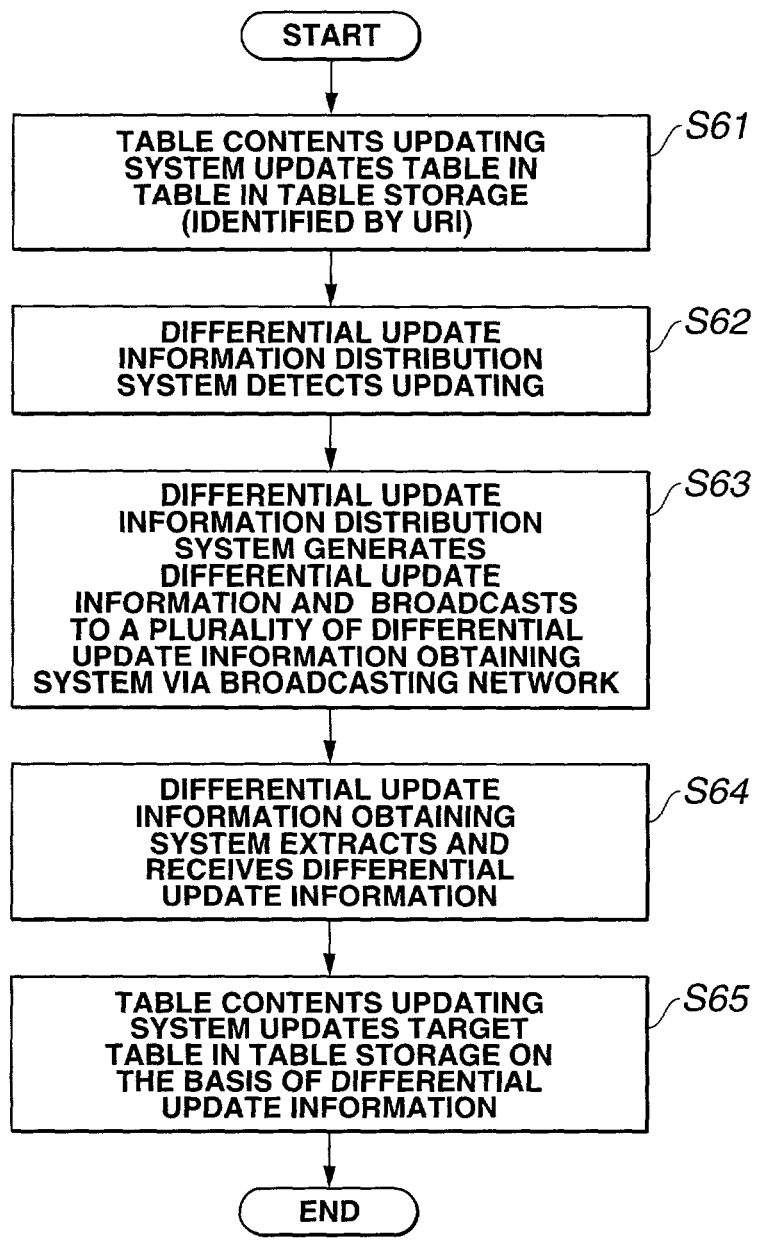
FIG. 11 is a flowchart showing update processing by the differential update information system.

FIG. 11 shows the update processing in the differential update information transmission/reception system shown in FIG. 9. First, at step S61, the table contents updating system 121 updates the table (identified by URI) in the table storage area 122. In this case, URI (uniform resource identifier) is identification information which is considered as an extension of URL (uniform resource locator) used in HTML texts of the Internet, as described above. In XML, the table is designated by this URI.

Next, when the differential update information distribution system 123 at step S62 detects the update of step S61, the differential update information is generated and broadcast to the differential update information obtaining systems 126 of the plurality of reception sites 125 via the broadcasting network 124, at step S63.

The differential update information transmitted to the reception sites 125 via the broadcasting network 124 is extracted and obtained by the differential update information obtaining system 126, at step S64.

Then, at step S65, the table contents updating system 127 updates the target table in the table storage area 128 on the basis of the differential update information that is extracted and received at step S64.

Figure 12:
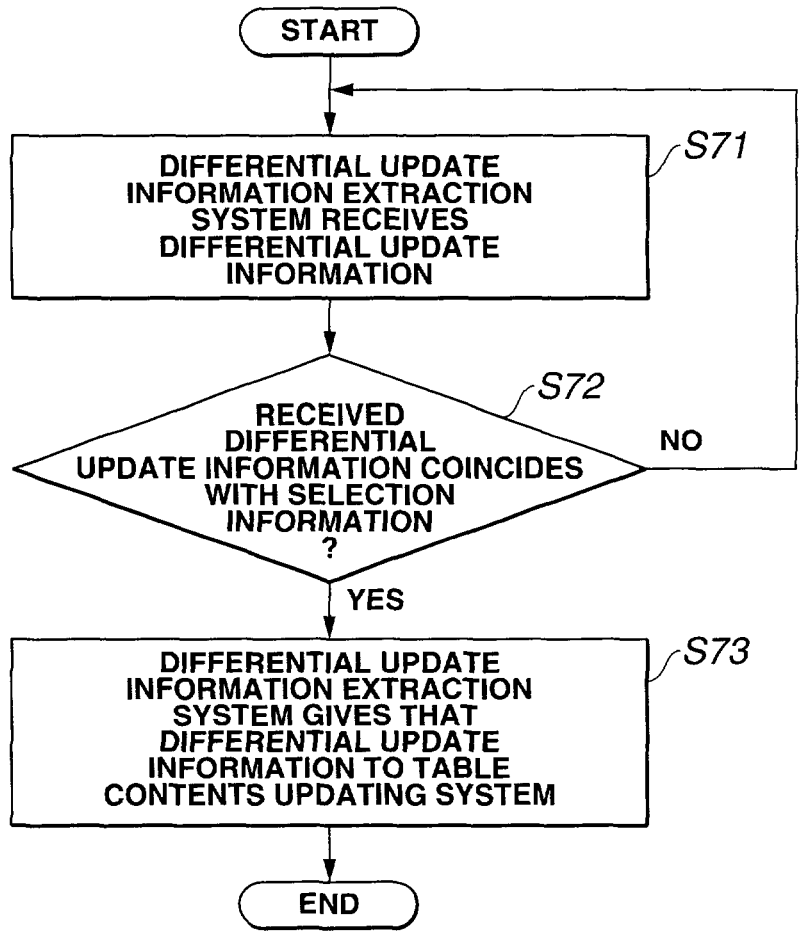
FIG. 12 is a flowchart showing the differential update information extraction and reception flow in the differential update information obtaining system.

The flow of reception of the differential update information in the differential update information obtaining system 126 at step S64 is shown in FIG. 12. First, at step S71, the differential update information extraction system 131 receives the differential update information. Then, it is discriminated whether or not the received differential update information coincides with the selection information stored in the selection information storage area 133. If the received differential update information coincides with the selection information, the differential update information is given to the table contents updating system 127, at step S73.

Figure 13:
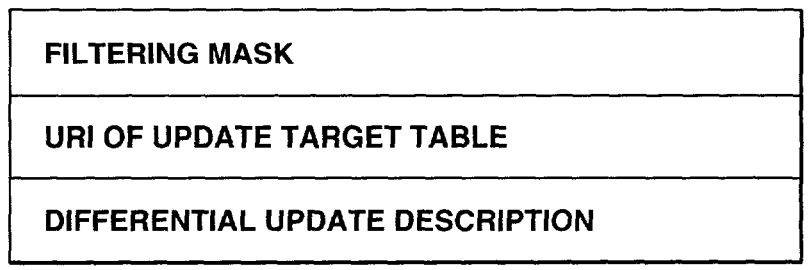
FIG. 13 shows the differential update information notification format.

When the differential update information distribution system 123 detects the change, in the contents of the table stored in the table storage area 122 (including generation and erasure of the whole table) at steps S61 to S63 of FIG. 11, differential update information shown in FIG. 13 (hereinafter referred to as differential update information notification format) is generated.

In the differential update information notification format, the URI associated with the update target table is described. Morever, a filtering mask for causing the reception site 125 to discriminate only a predetermined portion of the URI is generated and added as a header.

The filtering mask is the information used for discriminating whether the differential update information should be extracted or not at step S72 of FIG. 12. Differential update description is the description of differential update processing for the table identified by the URI of the update target table.

To generate the differential update information notification format, the differential update information distribution system 123 first generates a filtering mask and adds this filtering mask to the URI of the update target table and to the differential update description. The differential update information notification format data thus generated is transmitted to the broadcasting network 124.

The filtering mask is used in the comparison processing at step S72 of FIG. 12, of the differential update information extraction processing at step S64 of FIG. 11. Prior to the reception of the differential update information, the selection information updating system 132 of FIG. 10 stores and updates the filtering mask in the selection information storage area 133.

A specific example of the filtering mask will now be described. The URI is a text character array and is a long byte array with a variable length. First, by applying a hash function, the URI can be changed to a short byte array with a fixed length (for example, 4 bytes). Using this hash function for comparison, unwanted processing cost or overhead in the comparison can be reduced. Prior to the reception of the differential update information, the selection information updating system 132 prepares a list of URIs of copies (already broadcast, received and stored) of the tables stored in the table storage area 122, stored in the table storage area 128, and stores the list into the selection information storage area 133.

For example, in the case where the differential update target table is of "recommended program information" shown in the following Table 1, it is possible to extract only the differential update information of the recommended program information related to the genre desired by the end user. The recommended program information in this case corresponds to today's recommended program information provided outside of the television and radio program guide section in the newspaper or magazine. For example, in the case where the end user prefers sports programs, it is possible to extract only the recommended program information corresponding to the genre of sports.

TABLE 1

"Recommended Program Table"

| ASHID1 | UCH1 | DAY1 | SHID1 | LDESC1 |
|---|---|---|---|---|
| ASHID2 | UCH2 | DAY2 | SHID2 | LDESC2 |
| ... | ... | ... | ... | ... |
| ASHIDn | UCHn | DAYn | SHIDn | LDESCn |

ASHID: recommended program ID
UCH: channel number uniquely distributed nationwide
DAY: date
SHID: program ID
LDESC: long introductory text of program The recommended program information has no field of genre ID (JID). However, the relation between JID and the dummy program ID (DSHID) is known from "program material information" shown in Table 2, and the relation between the dummy program ID (DSHID) and the program ID (SHID) is known from "program framework information" shown in Table 3. Therefore, the corresponding relation between the recommended program and the genre can be identified.

TABLE 2

"Program Material Information"

| DSHID1 | JID1 | FEA1 | SHNAME1 | SDESC1 | LDESC1 |
|---|---|---|---|---|---|
| DSHID2 | JID2 | FEA2 | SHNAME2 | SDESC2 | LDESC2 |
| ... | ... | ... | ... | ... | ... |
| DSHIDn | JIDn | FEAn | SHNAMEn | SDESCn | LDESCn |

DSHID: dummy program ID; unique within dummy channel
JID: genre ID
FEA: 8-bit flag; each bit represents HD or SD
SHNAME: name of program
SDESC: brief explanation of program
LDESC: long explanation of program

TABLE 3

"Program Framework Information"

| SHID1 | ST1 | DCH1 | BN1 | DSHID1 |
|---|---|---|---|---|
| SHID2 | ST2 | DCH2 | BN2 | DSHID2 |
| ... | ... | ... | ... | ... |
| SHIDn | STn | DCHn | BNn | DSHIDn |

SHID: program ID; unique within channel
ST: start time
DCH: dummy channel
BN: block number; unique within dummy channel
DSHID: dummy program; unique within dummy channel Prior to the reception of the differential update information, the selection information updating system 132 prepares a list of JIDs in accordance with the preference of the end user and stores the list into the selection information storage area 133. For example, the list of JIDs can be prepared by presenting a list of genre information to the end user and then letting the end user select a genre name preferred by the end user.

The program material information is block-based program information for each dummy channel. The URI is equal to the dummy channel number+the block number, and there are tables corresponding to the number of dummy channels×the number of simultaneously transmitted blocks. By designating desired dummy channel number and block number, desired program material information is obtained.

The program framework information is program framework information of one day for each channel. The URI is equal to the channel number+the date, and there are tables corresponding to the number of channels×the number of days of simultaneous transmission. By designating desired channel number and date, desired program framework information is obtained.

In the case where the differential update target table is of the "recommended program information" shown in Table 1, it is also possible to extract only the differential update information of the recommended program information related to the personality/actor preferred by the end user. For example, in the case where the end user likes Bruce Willis, it is possible to extract only the recommended program information in which Bruce Willis shows up. The recommended program information has no field of personality ID (TID). However, since the relation with SHID of the recommended program information is known from the correspondence between TID and SHID of the personality appearance information shown in Table 4, the corresponding relation between the recommended program and the personality appearing therein can be identified.

TABLE 4

"Personality Appearance Information"

| TDI1 | TNAME1 | NUM1 | UCH1 | DAY1 | SHID1 | ... |
|------|--------|------|------|------|-------|-----|
| TID2 | TNAME2 | NUM2 | UCH2 | DAY2 | SHID2 | ... |
| ... | ... | ... | ... | ... | ... | ... |
| TIDn | TNAMEn | NUMn | UCHn | DAYn | SHIDn | ... |

TID: personality ID
TNAME: name of personality
NUM: number of programs in which personality appears
UCH: number of channels
DAY: date
SHID: program ID TID: personality ID
TNAME: name of personality
NUM: number of programs in which personality appears
UCH: number of channels
DAY: date
SHID: program ID The personality appearance information in this case is for displaying a list of programs in which the personality appears, from the list of names of personalities. Neither the user has to enter the name of personality as a keyword, nor the receiver has to have a retrieval function. However, the fixed name of personality that is designated on the sending side is used.

Prior to the reception of the differential update information, the selection information updating system 132 prepares a list of TIDs in accordance with the preference of the end user and stores it into the selection information storage area 133. For example, the list of TIDs can be prepared by presenting a list of personality information to the end user and then letting the end user select the name of a personality preferred by the end user.

In the case where the differential update target table is of the "recommended program information" shown in Table 1, it is also possible to extract only the differential update information of the recommended program information related to the news topic preferred by the end user. For example, in the case where the end user is interested in economic news, it is possible to extract only the recommended program information related to economic news. The recommended program information has no field of news topic ID (NID). However, since the relation with SHID of the recommended program information is known from the correspondence between NID and SHID of "news topic information" shown in Table 5, the corresponding relation between the recommended program and the news topic can be identified.

TABLE 5

"News Topic Information"

| NID1 | NNAME1 | NUM1 | UCH1 | DAY1 | SHID1 | ... |
|------|--------|------|------|------|-------|-----|
| NID2 | NNAME2 | NUM2 | UCH2 | DAY2 | SHID2 | ... |
| ... | ... | ... | ... | ... | ... | ... |
| NIDn | NNAMEn | NUMn | UCHn | DAYn | SHIDn | ... |

NID: news topic ID
NNAME: name of news topic
NUM: number of broadcasting programs
UCH: number of channels
DAY: date
SHID: program ID NID: news topic ID
NNAME: name of news topic
NUM: number of broadcasting programs
UCH: number of channels
DAY: date
SHID: program ID The news topic information in this case is for displaying a list of programs broadcasting news related to the corresponding topic, from the list of news topics.

Prior to the reception of the differential update information, the selection information updating system 132 prepares a list of NIDs in accordance with the preference of the end user and stores the list into the selection information storage area 133. For example, the list of NIDs can be prepared by presenting a list of news topic information to the end user and then letting the end user select a news topic preferred by the end user.

Using similar methods other than those described above, parameters within the other tables can be used as filtering mask values for the differential update information. By combining a plurality of these parameters, filtering conditions with higher selection accuracy can be set.

An example of differential update description in the differential update information notification format shown in FIG. 13 will now be described.

For example, a script for changing the contents of a certain attribute field in a certain record in the update target table can be used. A binary table object can be used for delivering general table data to the receiving side. It is possible to update the binary table object on the field basis by describing the procedure of changing the table contents via a DOM (document object model)—API using the ECMA (European Computer Manufacturers Association) Script. The ECMA Script in this case a script obtained by standardizing JavaScript. The DOM-API is an API with respect to how the contents of the binary table object should be changed.

Also, an SQL (structured query language) statement for changing the contents in a certain row and a certain column in the update target table can be used. By using the SQL statement, the table can be stored and managed in a general RDB (relational database) mounted at the reception site.

Other differential update description method may also be considered. By storing all these plural descriptions in the differential update description field of FIG. 13, it is possible to broadcast differential update information of the same contents to a plurality of reception sites which have different types of table management, systems mounted thereon. Thus, the receiving device can be caused to efficiently filter only the portion where updating occurred with respect to the contents in which the user is interested.

The encryption control of the object level of the binary table object will now be described.

In XML, a script describing the processing procedure is used. By downloading this script from transmitted data and executing it on the receiver, management of interaction with the end user and control of the graphical user interface can be carried out. Also, minute changes of the control scenario are made possible. The text/numerical value information of the EPG/advertisement or the like handled in this script is being standardized. In accordance with the specification of BS2000, it is stored in a binary table object prescribed by the BML (broadcast multimedia language, based on XML and specialized for broadcasting) specification and thus broadcast to the receiver. By dynamically updating and broadcasting the contents of this binary table object, it is not necessary to sequentially change and re-download the contents of the display control information and script of the BML used for displaying the EMP/advertisement information.

Meanwhile, in some cases, depending on the type of EPG/advertisement information transferred in the binary table object, it is necessary to carry out control so as to present the information only to the end user who belongs to a certain viewer contract class in order to realize discrimination of services. However, the BML does not particularly prescribe the encryption processing for individual binary table objects (module level of data carousels). Thus, a technique for realizing the encryption control for the object level of the binary table object will now be described.

Figure 14:
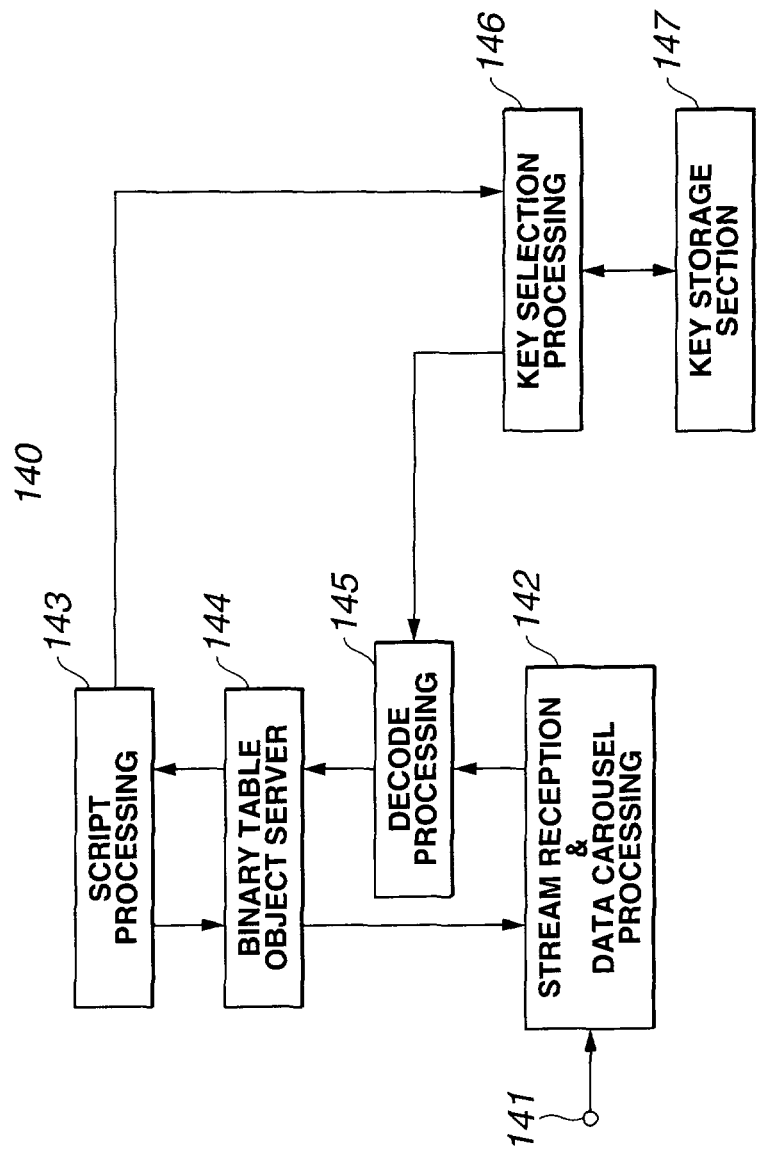
FIG. 14 is a block diagram showing the structure of a guide information receiving device as an embodiment of the present invention.

A data processing device 140 shown in FIG. 14 corresponds to the detailed structure of the DSM-CC processing section 70 and the XML processing section 71 of FIG. 8, and processing is actually carried out by software.

In the data processing device 140, a stream reception and data carousel processing section 142 receives a broadcast stream in accordance with the MPEG2-TS (transport stream) via an input terminal 141. The stream reception and data carousel processing section 142 corresponds to the demultiplexer 53 and the DSM-CC processing section 70 of FIG. 8. The stream reception and data carousel processing section 142 resolves the MPEG2-TS, resolves the data carousel, and then gives only the program information of the binary table object format to a binary table object server 144.

The binary table object server 144 stores the binary table object. A script processing section 143 gives a contents inquiry method from the user to the binary table object server 144 and causes the binary table object server 144 to respond thereto.

Some of the binary table objects need to be controlled so as to be presented only to the user who belongs to a certain viewer contract class in order to realize discrimination of services. These binary table objects are encrypted on the transmission side. In the data processing device 140, a decode processing section 145 decodes the encrypted program information, if necessary. The program information decoded by the decode processing section 145 is supplied to the binary table object 144.

The decode processing section 145 decodes the encrypted program information by using a decoding key obtained from the script in the broadcast stream. The decoding key is stored in a key storage section 147 connected to a key selection processing section 146. That is, the key selection processing section 146 takes out from the key storage section 147 a decoding key corresponding to a key inquiry from the decode processing section 145 and supplies the decoding key to the decode processing section.

Figure 15:
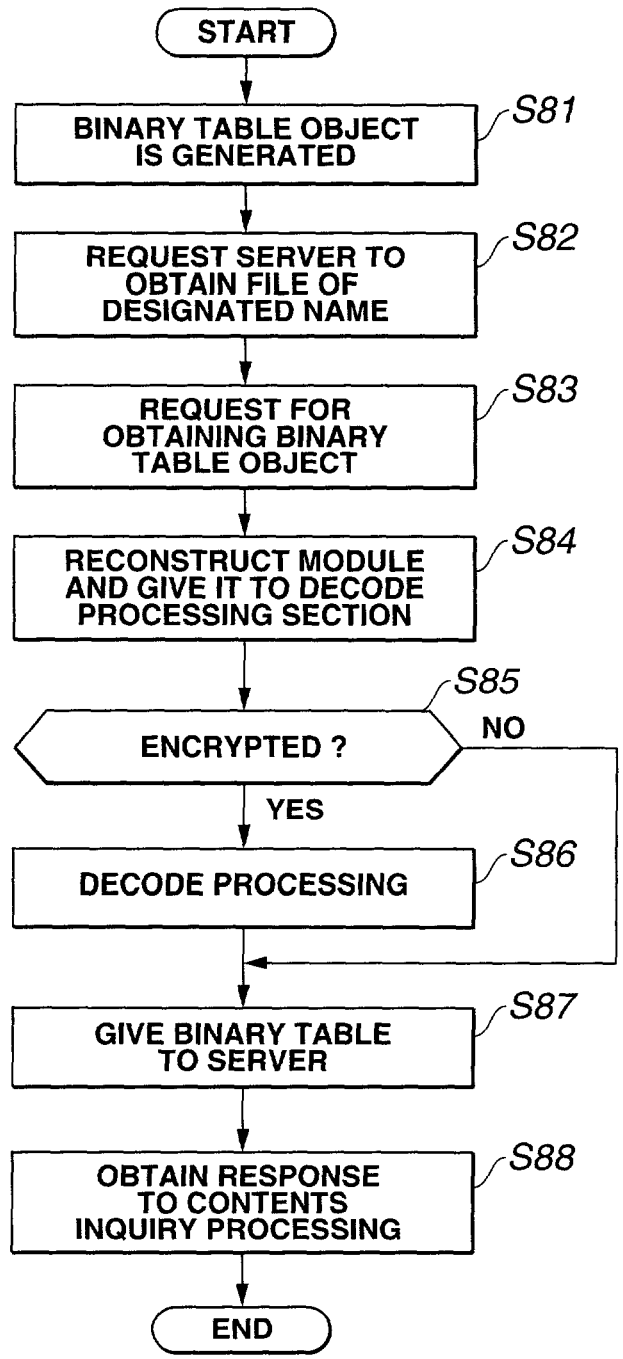
FIG. 15 is a flowchart for explaining the operation of the program information receiving device.

The operation of the data processing device 140 is shown in the flowchart of FIG. 15. First, at step S81, the script processing section 143 designates generation of a binary table object in response to the operation by the user. This is, for example, described as follows in the script.

BinaryTable bt=BinaryTable("URI of BinaryTable object", "format designation")

Then, at step S82, the binary table object server 144 is requested to obtain a file of the designated name in the constructor (executed by the script processing system with a program code for carrying out generation of an object) of the binary table object.

Next, at step S83, the binary table object server 144 requests the stream reception and data carousel processing section 142 to obtain the binary table object requested at step S82.

Then, at step S84, since the file of the binary table object is stored as the resource in the module of the data carousel, the stream reception and data carousel processing section 142 reconstructs the module in which the binary table object is stored, from fragmented data blocks. The group of fragmented data blocks is suitably cached in advance in a storage area (with a size that enables storage of a plurality of data blocks) of the stream reception and data carousel processing section 142 from the broadcast stream. The cache is updated every time new fragmented blocks are received. Then, the stream reception and data carousel processing section 142 supplies the obtained module to the decode processing section 145.

At step S85, the decode processing section 145 examines the content type (media type) of the entity header in the module. If there is a description of "application/SLEX_encrypted_btable", the processing goes to step S86 and decode processing of the binary table object stored in the entity body of the module is carried out. If not encrypted, the binary table object stored in the entity body of the module is supplied as it is to the binary table object server.

At step S86, the decode processing section 145 obtains the decoding key from the key selection processing section 146 and carries out decode processing of the file. At step S87, the decode processing section 145 gives the decoded binary table object to the server 144.

Then, at step S88, with respect to the contents inquiry processing of the subsequent binary table object described in the script, the script processing section 143 issues an inquiry method to the server 144 and obtains a response thereto from the contents of the binary table object spread in the memory (storage area protected from any external access except for the script processing system) of the server 144. The execution of the inquiry method is checked every time it is started, in order to determine whether execution is permitted. On completion of a series of inquiries from the script, the spread binary table object is erased from the memory.

For transmission of resources such as BML texts and mono-media data referred to from these texts, a data carousel transmission system defined by "Data Broadcasting System Specification Part 2" is used. In individual modules (transfer units) transmitted by using the data carousel system, resources are stored in the HTTP/1.1 entity format prescribed by IETF RFC2068. The entity is made up of an entity body including a resource, and an entity header including meta information thereof (information related to the contents of the resource). By designating a character array such as "application/SLEX_encrypted_btable" in a field of content type (media type) in the entity header, it can be expressed that the contents of the stored resource are encrypted. If the contents are not encrypted, a character array such as "application/X-arib-btable" is designated.

Module=*entity-header
  CRLF
  [entity-body]

Figure 16:
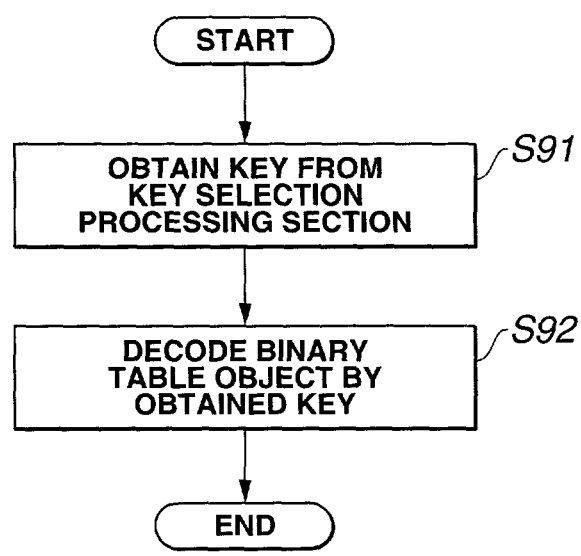
FIG. 16 is a flowchart for explaining the decode processing in detail.

The encrypted resource stored in the part of entity body is decoded when the binary table object is generated in the script. The decoding procedure is as shown in the flowchart of FIG. 15. The processing of step S86 will now be described in detail with reference to FIG. 16.

Specifically, at step S91, the decode processing section 145 obtains the key from the key selection processing section 146. Then, at step S92, the decode processing section 145 decodes the binary table object by using the obtained key.

The obtaining and storage of the key will now be described. The format of the binary table object after decoding is uniquely defined by the URI designated in generating the binary table object. For example, by allocating a special URI to enable recognition of the key to the stored binary table object file and prescribing the format thereof, the contents inquiry can be carried out using various types of methods of the binary table object.

To obtain the key, the URI proper to the key is designated and a binary table object is generated in the script. For example, the key of plaintext is taken out by "BinaryTable/toString( )" or the like, and this key is supplied to the key selection processing section 146. The key selection processing section 146 stores the key into the storage area (nonvolatile memory, disc or the like) and thus prepares for key inquiry from the decode processing section 145. Although it depends on the application, this key obtaining processing is carried out once a month, that is, several days before the end of the month, for example, in the case where the key is updated at the end of the month as one cycle.

In response to the key inquiry from the decode processing section 145, the key selection processing section 146 sends back the corresponding key with reference to the date and time of the inquiry.

Figure 17:
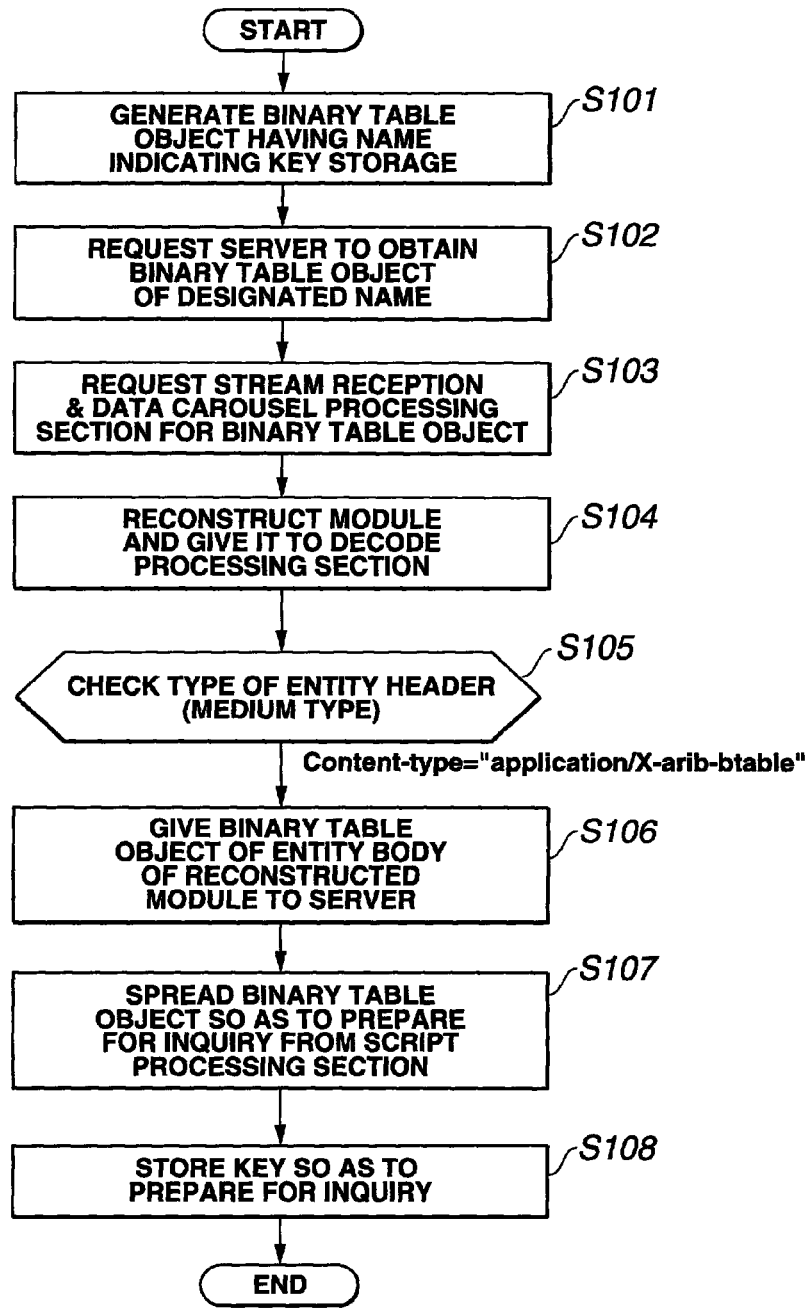
FIG. 17 is a flowchart for explaining the obtaining and storage of a key.

The key must be broadcast prior to the broadcast of the encrypted binary table object. The obtaining of the key and the storage of the key to the key selection processing section are summarized in the flowchart of FIG. 17.

Specifically, at step S101, the script processing section 143 gives an instruction to generate a binary table object having a name indicating the storage of the key, and at step S102, the binary table object server 144 is requested to obtain the binary table object of the designated name.

At step S103, the stream reception and data carousel processing section 142 is requested to provide the binary table object. Then, at step S104, the stream reception and data carousel processing section 142 obtains fragmented data blocks of the module in which the binary table object is stored, from the stream, then reconstructs the module, and supplies it to the decode processing section 145.

At step S105, the decode processing section 145 examines the type (media type) of the entity header. If the content type is "application/x-arib-btable", the processing goes to step S106 and the binary table object of the entity body of the reconstructed module is supplied to the server 144.

The binary table object server 144 spreads the binary table object supplied from the decode processing section 145 and thus prepares for inquiry from the script processing section 143.

The script processing section 143 obtains the contents of the key from the binary table object server 144 and supplies the contents to the key selection processing section 146. At step S108, the key selection processing section 146 stores the key into the safe storage area 147 and thus prepares for key inquiry from the decode processing section 145. Thus, the encryption control of the object level of the binary table object can be realized.

An object retrieving method for detecting the EPG information itself as an object from the XML text will be described hereinafter.

In the contents in accordance with the XML system, the screen layout and presentation control of program information are described by XML and script, and the information itself to be presented is an external object referred to from the XML text.

To refer to the program information itself from the XML text, it is desired to use the form of URI (uniform resource identifier), which is an extension of URL used in HTML texts of the Internet.

In general, the URI and data identified by the URI are in a one-to-one correspondence, and the data constituting the contents can be uniquely identified by the URI. However, in some cases, the URI with respect to the information to be presented cannot be statically determined at the time of preparing the XML text describing the screen layout of the program information. For example, when the layout for displaying an image on the upper right part of the screen is described as an XML text, if the user wants to discriminate a monochrome image and a color image in accordance with the profile (characteristics) of the receiving terminal, it cannot be determined which of the URI with respect to the monochrome image and the URI with respect to the color image should be embedded in the XML text. Conventionally, in order to carry out such advanced presentation processing, control by the script in the XML text is necessary.

Thus, an object retrieving method for designating and referring to the EPG information itself from the XML text by using the URI will be described.

Figure 18:
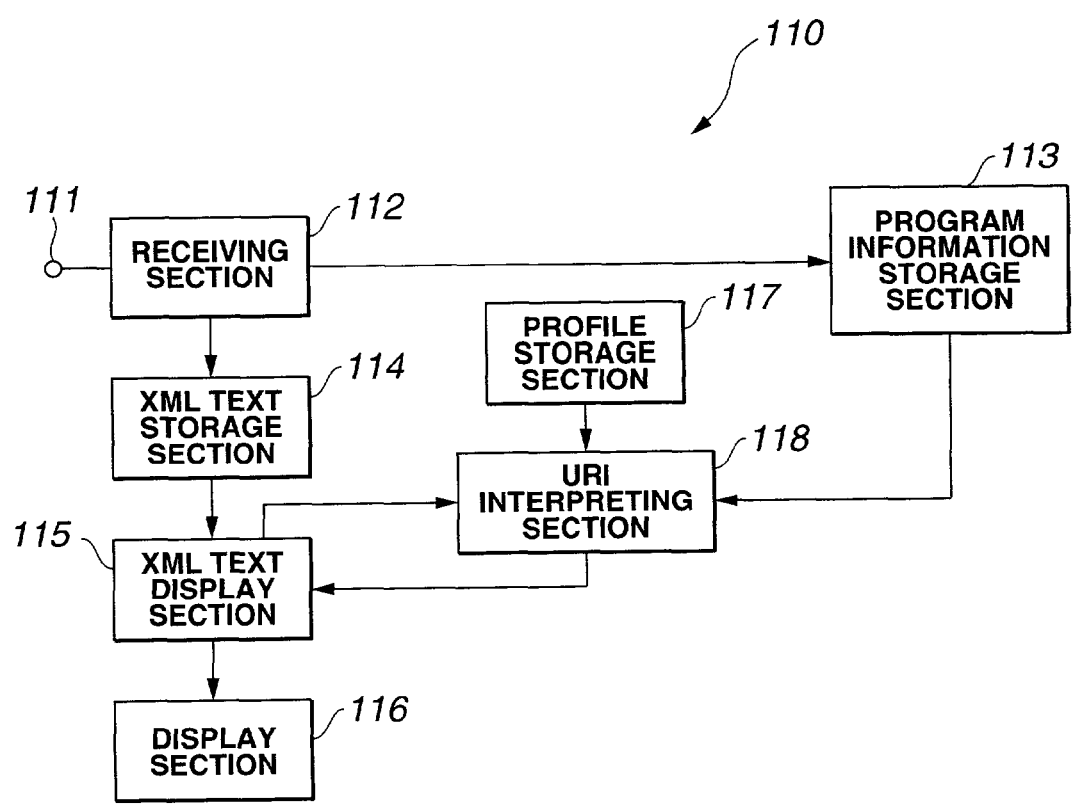
FIG. 18 is a block diagram showing the structure of a program information receiving device as an embodiment of the present invention.

FIG. 18 shows a data processing device 110 for processing EPG data described in XML, which is equivalent to the CPU 67 of FIG. 8.

The data processing device 110 has a receiving section 112 for receiving an XML text for an EPG screen and program information itself transmitted from the transmission side, a program information storage section 113 for storing the program information itself received by the receiving section 112, an XML text storage section 114 for storing the XML text, an XML text display section 115 for extracting a group item designated as the URI in the XML text received by the receiving section 112 and carrying out display processing, a display section 116, a profile storage section 117 for storing profile data of the receiving device, and a URI interpreting section 118 for reading out the profile data of the receiving side corresponding to the group item extracted by the XML text display section 115 from the profile storage section 117 and retrieving an object within the item corresponding to the profile data.

The receiving section 112 receives the program information and program guide text via an input terminal 111. The program information storage section 113 stores the received program information table. The XML text storage section 114 stores the received program guide XML text. The XML text display section 115 interprets the XML text stored in the XML text storage section 114, then prepares a display image and displays it onto the display section 116, in response to a request from the user.

The URI interpreting section 118 interprets the URI within the XML text and takes out information corresponding to the URI in the program information storage section 113.

Figure 19:
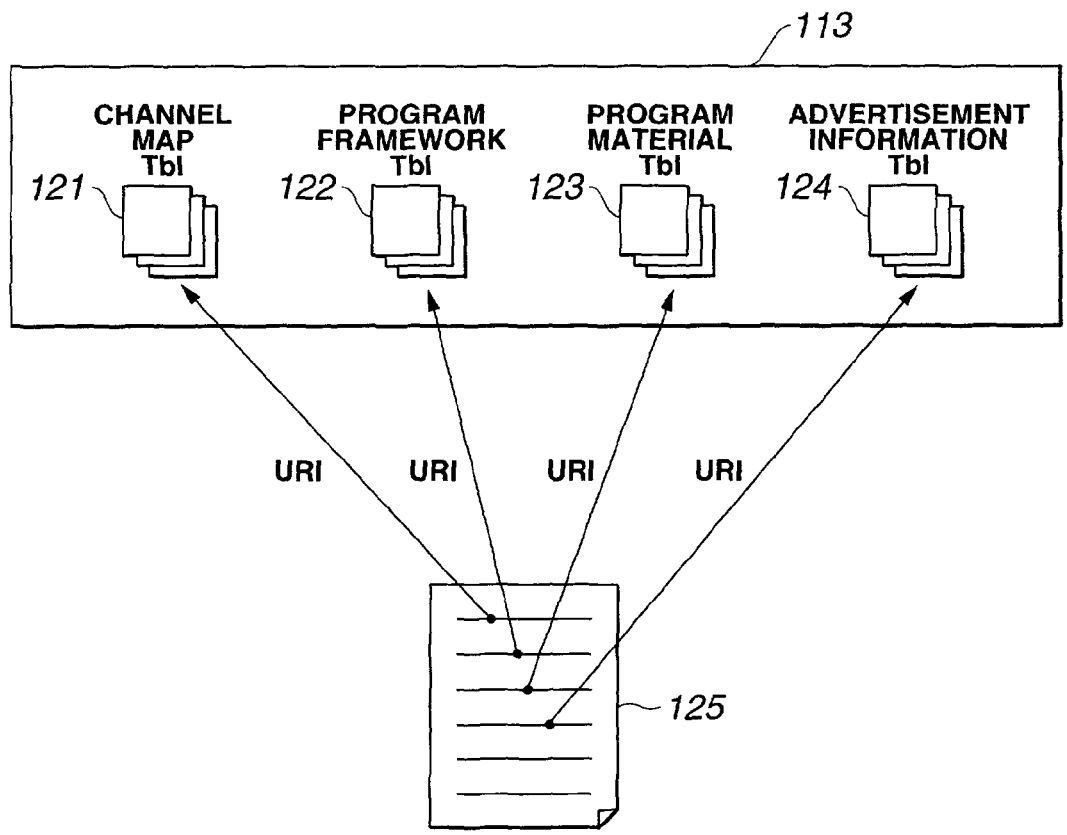
FIG. 19 shows a specific example of program information stored in a program information storage section constituting the program information receiving device.

FIG. 19 shows a specific example of the program information, which is the contents of the program guide, stored in the program information storage section 113. The program information includes a channel map table 121, a program framework table 122, a program material table 123, and an advertisement information table 124. These tables are referred to from a program guide XML text 125 in accordance with the URI.

In the profile storage section 117, information proper to the receiver, that is, profile information such as the area code and the contract class when using the receiver and the hardware capability of the receiver, are stored. The profile in this case generally means a set of various attribute settings proper to the hardware, software, user and application.

Specific examples of the profile may be user profile, hardware profile, software profile, and application profile.

The user profile is a profile representing individual information such as the age, sex, nationality, address, language used, hobby, and preferences of the user. The hardware profile is a profile representing various specifications such as the function, performance and equipment structure of the hardware. The software profile is a profile representing the operating system, various types of drivers, and the structure and version of library.

Exemplary descriptions of the respective profiles in accordance with the RDF are presented hereinafter.

```
<?xml version="1.0"?>
<rdf:RDF
    xmlns:rdf="http://www.w3.org/TR/REC-rdf-syntax#"
    xmlns:prf="http://www.w3.org/TR/WD-profile-vocabulary#">
//user profile
    <rdf:Description about="UserPreferences">
        <prf:Defaults
            Age=?"
            Sex="Male"
            Country="Japan"
            Language="Japanese"/>
    </rdf:Description>
//hardware profile
    <rdf:Description about="HardwarePlatform">
        <prf:Defaults
            Vendor="Sony"
            Model="PCG-N505"
            Type="B5 note"
            ScreenSize=?x768"
            CPU="Pentium II"
            Keyboard="US101"
            Memory=?MB"
            USB=0.0"
            Ilink="S400"/>
        <prf:Modifications
            Speaker="Mounted"/>
    </rdf:Description>
//software profile
    <rdf:Description about="SoftwarePlatform">
        <prf:Defaults
            OS="Aperios"
            OSVersion=0.0"
            JavaVMVersion=0.1"/>
        <prf:Modifications
            Sound="Off"/>
    </rdf:Description>
//application profile
    <rdf:Description about="NetscapeCommunicator4.6">
        <prf:Defaults
            HTMLVersion=0.0"/>
    </rdf:Description>
    <rdf:Description about="EudoraPro4.0">
        <prf:Defaults
            HTMLMail="No"/>
    </rdf:Description>
</rdf:RDF>
```

When interpreting the URI, the URI interpreting section 118 refers to the above-described profiles stored in the profile storage section 117.

A specific example of the XML text will now be described.

```
<BML>
<SCRIPT>
    channelMap=newBinaryTABLE("arib-dc://./ChannelMapTbl", I:1B, I;1V");
</SCRIPT>
<!-advertisement area->
<OBJECT SRC="arib-dc://./Advertise1">
</BML>
```

In this example, first, a table "channelMap" of the program information used within the script is taken out from a table referred to by the URI "arib-dc://./ChannelMapTbl". The channel map table is a table having stored thereon a list of channels that can be received in the area of the receiving terminal in the reception of ground waves.

Then, an object referred to by the URI "arib-dc://./Advertise1" is displayed in the advertisement area.

Figure 20:
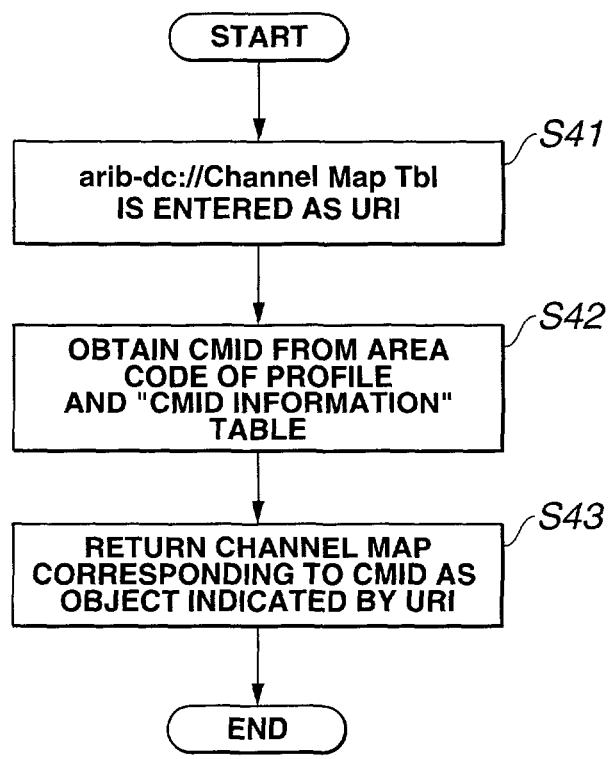
FIG. 20 is a flowchart for explaining a specific example of the processing carried out by a URI interpreting section constituting the program information receiving device.

The processing carried out by the URI interpreting section 118 when the XML text display section 115 of FIG. 18 displays the channel map of the above-described XML text will be described with reference to FIG. 20.

First, at step S41, the XML text display section 115 enters the URI "arib-dc://ChannelMapTbl" to the URI interpreting section 118 and instructs the URI interpreting section 118 to interpret the URI. Then, at step S42, the URI interpreting section 118 refers to the area code in the receiver profile stored in the profile storage section 117 and thus obtains the ID number of a channel map table corresponding to the area code, of the channel map tables having stored thereon the corresponding relations between the area code and the channel information.

Next, at step S43, the channel map corresponding to the ID is sent back as data to the XML text display section 115. Then, the XML text display section 115 displays the received channel map onto the display section 116.

Figure 21:
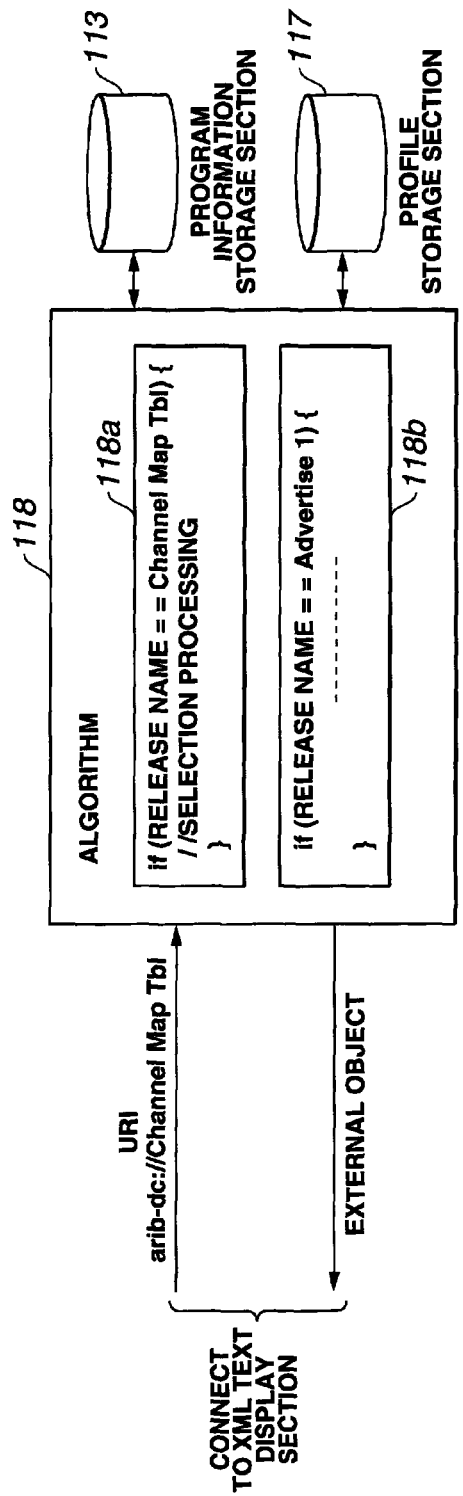
FIG. 21 shows the structure of the URI interpreting section.

FIG. 21 shows the structure of the URI interpreting section 118. On receiving the URI, the URI interpreting section 118 selects appropriate one from the program information tables with reference to the receiver profile, and sends back the program information table to the XML text display section 115 as an external object. For example, in the case where a Kanto Area channel map (KantoChMap) and a Kansai Area channel map (KansaiChMap) are stored as the program information tables, these channel map tables can be uniquely identified by URIs "arib-dc://KantoChMap" and "arib-dc://KansaiChMap", respectively. That is, the URI interpreting section 118 sends back the Kanto Area channel map in response to "arib-dc://KantoChMap" and sends back the Kansai Area channel map in response to "arib-dc://KansaiChMap".

Meanwhile, from the viewpoint of the preparation side of the XML text describing the program guide, it is desired that the URI interpreting section 118 is so constructed as to send back the Kanto Area channel map as an external object if the receiver is installed in the Kanto Area as a result of interpretation of "arib-dc://ChannelMapTbl" by the URI interpreting section 118, and to send back the Kansai Area channel map as an external object if the receiver is installed in the Kansai Area. The URI interpreting section 118 refers to the area code of the receiver profile and sends back the table corresponding to "arib-dc://KantoChMap" in the case of the area code of Kanto Area.

Figure 22:
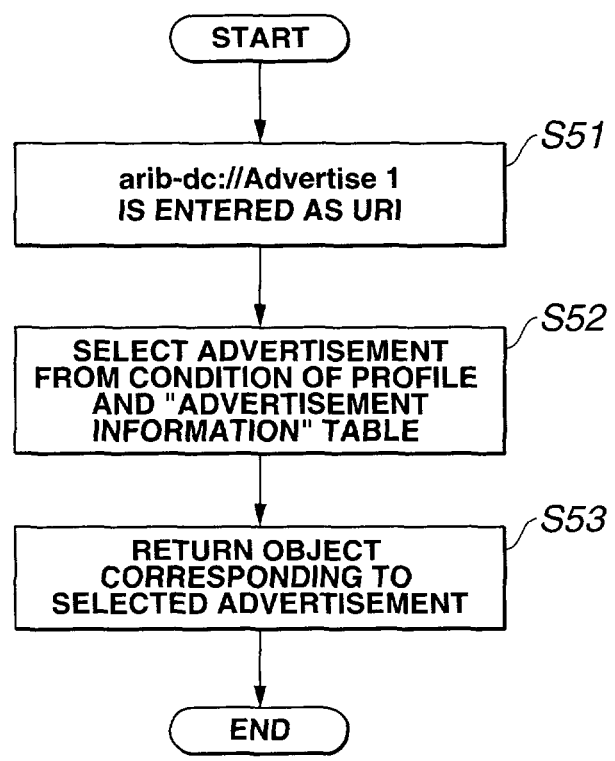
FIG. 22 is a flowchart for explaining another specific example of the processing carried out by the URI interpreting section constituting the program information receiving device.

The processing carried out by the URI interpreting section 118 when the XML text display section 115 of FIG. 18 displays the advertisement area of the above-described XML text will be described with reference to FIG. 22.

First, at step S51, the XML text display section 115 enters the URI "arib-dc://Advertise1" to the URI interpreting section 118 and instructs the URI interpreting section 118 to interpret the URI. Then, at step S52, the URI interpreting section 118 refers to the receiver profile and the "advertisement information table" having advertisement information (expiration date of advertisement, display position, display condition) stored thereon, and thus selects an advertisement image that meets the conditions.

Then, at step S53, the selected advertisement image is sent back as data to the XML text display section 115. The XML text display section 115 displays the received image onto the display section 116.

The above-described algorithm for selecting the external object can be so constructed that it can be downloaded and replaced as a script from the network, and is sent together with the program information.

Thus, the interpretation mechanism for interpreting the URI in the XML text can refer to the profile information stored in the receiver and carry out dynamic URI interpretation in accordance with the program information. Therefore, the producer of the contents (that is, XML text) need not describe the presentation control in the contents by using a complicated script with reference to the receiver profile.

The power control of the receiving device for receiving the EPG will now be described.

In order to carry out fixed-time transmission of the EPG data as described above, it is necessary to notify the receiver of the time at which the data is transmitted and to control the receiver so as to carry out the receiving operation at that time. Moreover, the operation of the receivers must be controlled so as to prevent numerous receivers from simultaneously turning on the power source to start the receiving operation at the time when fixed-time transmission is to be carried out. The control for preventing concentration of the receiving operation at a time will be described hereinafter.

Figure 23:
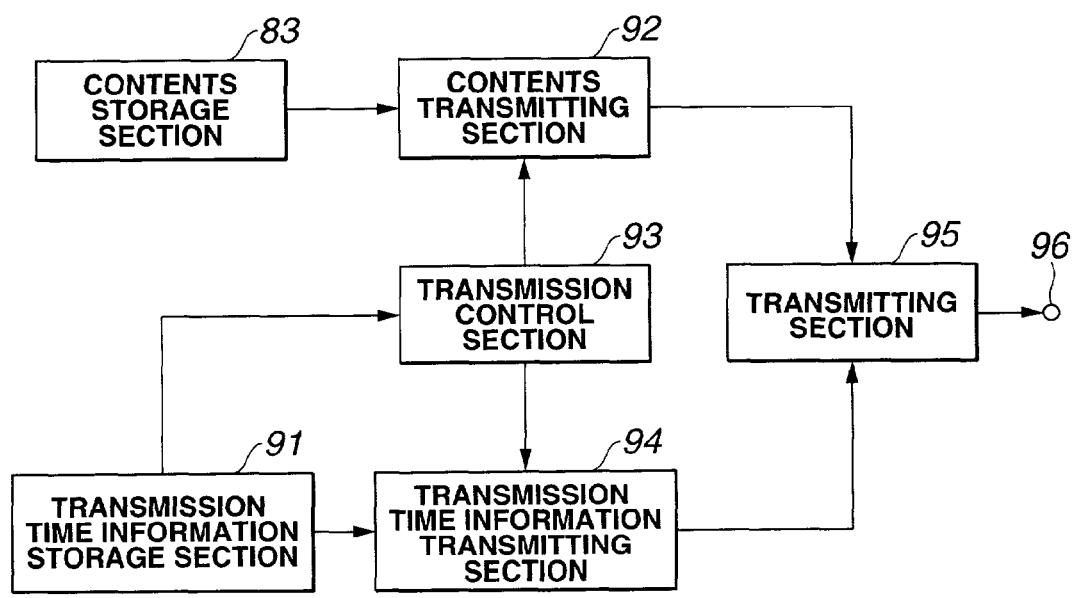
FIG. 23 is a block diagram showing the structure of the transmission side in the program information transmission/reception system.

An exemplary structure of the transmitting device for the contents such as the EPG is shown in FIG. 23. This transmitting device corresponds to the details of the integrated EPG database 26 and the transmission control section 27 of FIG. 5 and the transmission processing section of FIG. 7. In a contents storage section 83, contents information to be provided to the user, for example, EPG information, is stored. In a transmission time information storage section 91, information of the distribution schedule for transmitting the contents is stored. A transmission time information transmitting section 94 carries out transmission to send the transmission time information stored in the transmission time information storage section to the receiving terminal. A contents transmitting section 92 transmits the contents information stored in the contents storage section 83 in accordance with the transmission schedule stored in the transmission time information storage section 91.

A transmission control section 93 controls the transmission time information transmitting section 94 and the contents transmitting section 92 in accordance with the schedule in the transmission time information storage section 91. The transmitted information from the contents transmitting section 92 and the transmission time information transmitting section 94 is transmitted from the transmitting section 95 to the receiving terminal device via a broadcasting network output 96.

Figures 24, 25:
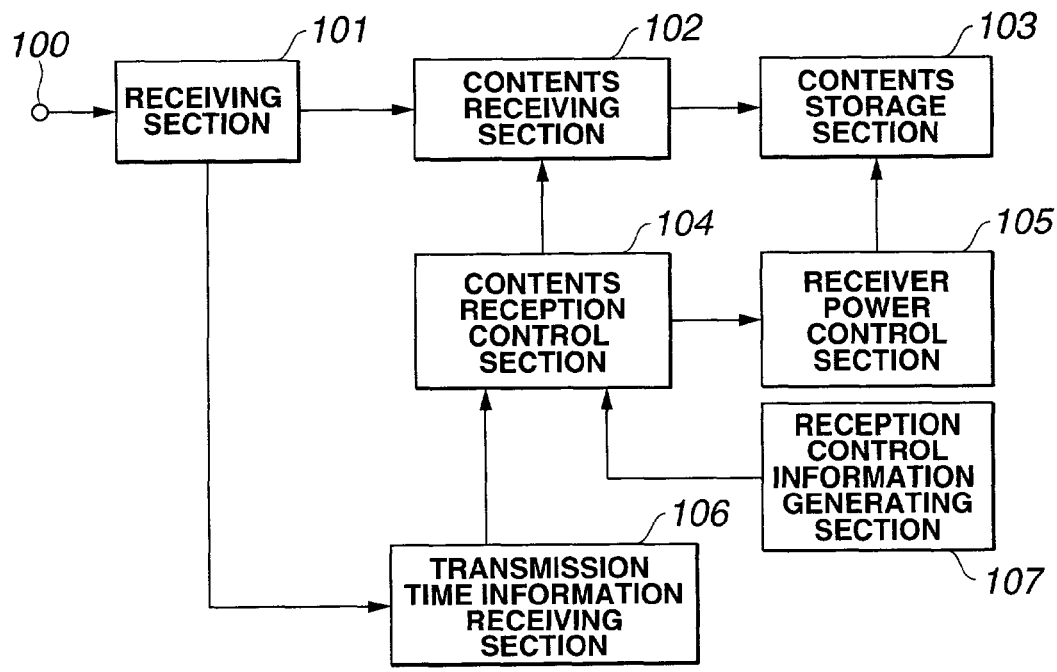
FIG. 24 is a block diagram showing the structure of a receiving terminal device in the program information transmission/reception system.
FIG. 25 shows an exemplary structure of transmission time information.

An exemplary structure of a receiving terminal device 85 is shown in FIG. 24. FIG. 24 shows the details of essential portions of FIG. 8. A receiving section 101 receives a data stream via the broadcasting network and an input terminal 100. A transmission time information receiving section 106 receives the transmission time information from the data stream. A reception control information generating section 107 generates control information proper to the receiver for controlling the reception of the contents. For example, the reception control information generating section 107 generates random numbers. A contents reception control section 104 determines the time at which the contents should be received from the information of the transmission time information receiving section 106 and the reception control information generating section 107, and thus controls a contents receiving section 102 and a receiver power control section 105. The receiver power control section 105 controls the power source of the receiver. In the case where the power of the receiver is off at the time when the contents should be received, the contents reception control section 104 controls the receiver power control section 105 to turn on the power of the receiver so as to start the contents receiving operation. After the reception of the contents, the power is turned off. The contents receiving section 102 receives the contents and stores the received contents into a contents storage section 103.

FIG. 25 shows an exemplary structure of the transmission time information. The transmission time information is a combination of the time of fixed-time transmission (PST: preload start time) and the control value (PEB: preload effective byte) designating the receiver which is to carry out the receiving operation at that time. For example, 8 bits are used as the PEB and the receiver generates random numbers of 0 to 7 in advance, and then the receiving operation is carried out only at a fixed-time transmission time when on-state bit positions are coincident between the random number values and the PEB.

Figure 26:
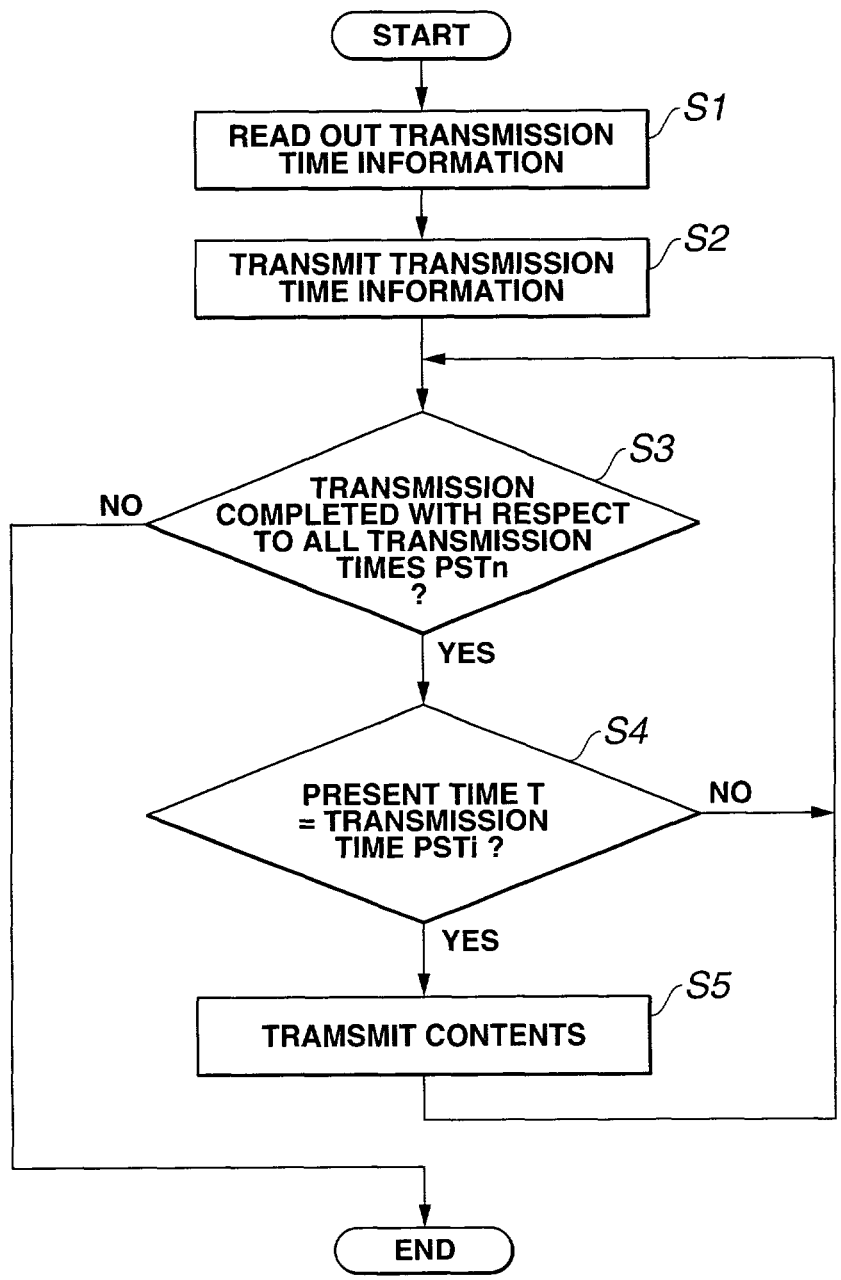
FIG. 26 is a flowchart showing the processing by a transmission control section on the transmission side.

FIG. 26 shows a flowchart for the transmission control section 93 of the transmitting device 82. First, at step Si, the transmission time information is read out from the transmission time information storage section 91. Next, at step S2, the read-out transmission time information is transmitted from the transmission time information transmitting section 94. Then, at steps S3 to S5, when the transmission start time comes with respect to each transmission time in the transmission time information, an instruction to transmit the contents from the contents storage section 83 is sent to the contents transmitting section 92, thus transmitting the contents.

Figure 27:
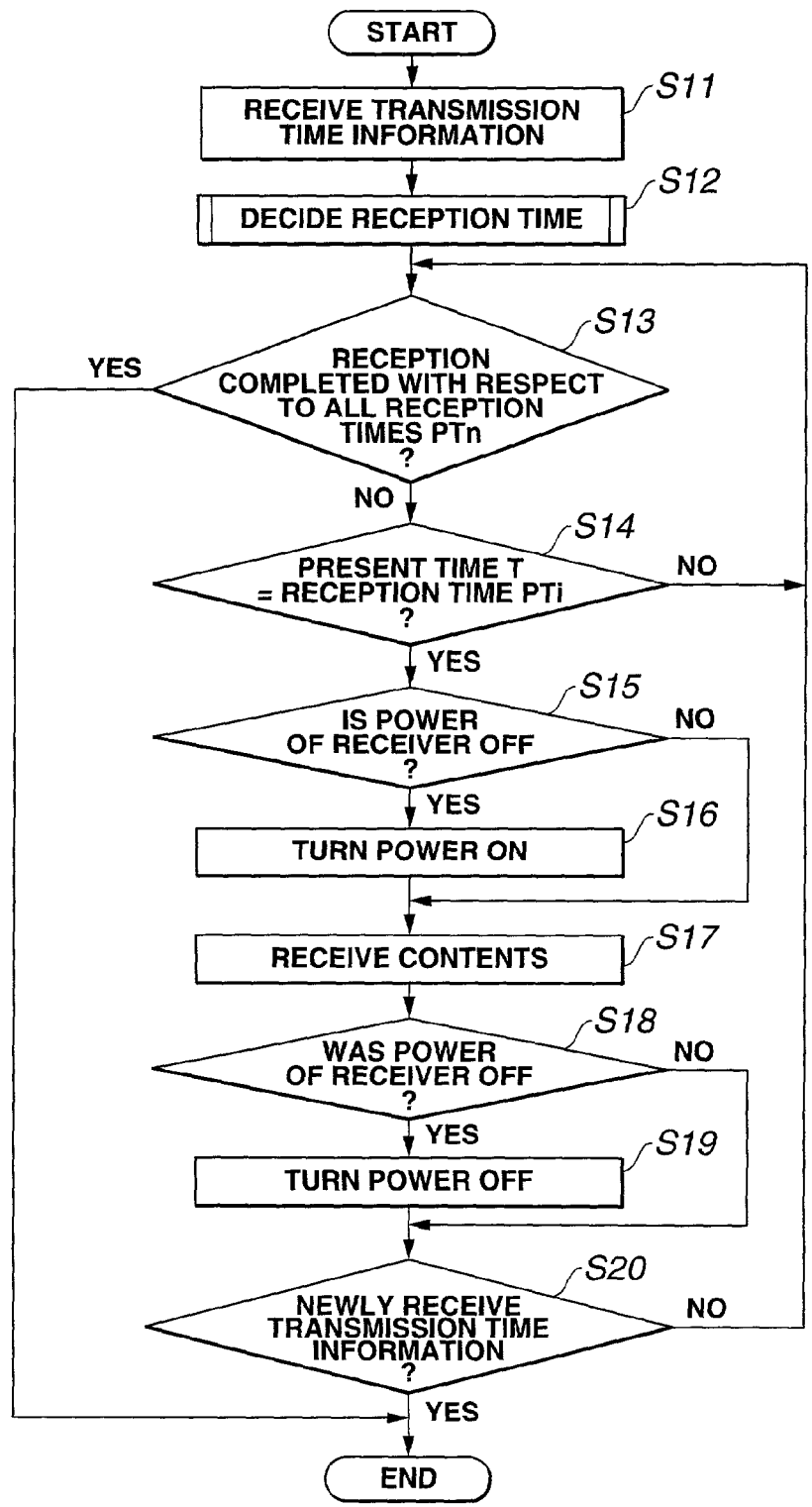
FIG. 27 is a flowchart showing the reception of contents by a contents reception control section of the receiving terminal device.

FIG. 27 shows a flowchart for explaining the contents reception at the contents reception control section 104 of the receiving terminal device 85. First, at step S11, the transmission time information is received. Next, at step S12, the time (time list) RT[n] for carrying out the contents receiving operation is determined from the received transmission time information. At steps S13 to S17, the current time T is compared with all the times RT[i] in the time list, and when the reception time is reached, if the power of the receiver for carrying out the receiving operation is not on, the receiver power control section 105 is instructed to turn on the power of the receiver, and the contents receiving section 102 receives the contents and stores the contents into the contents storage section 103. If it is determined at step S18 that the power of the receiver was originally off, the receiver power control section 105 is instructed to turn off the power of the receiver at step S19. If new transmission time information is not received at step S20, the reception processing in accordance with RT[n] is repeated. If new transmission time information is received, the processing ends so as to start processing based on the new transmission time information.

Figure 28:
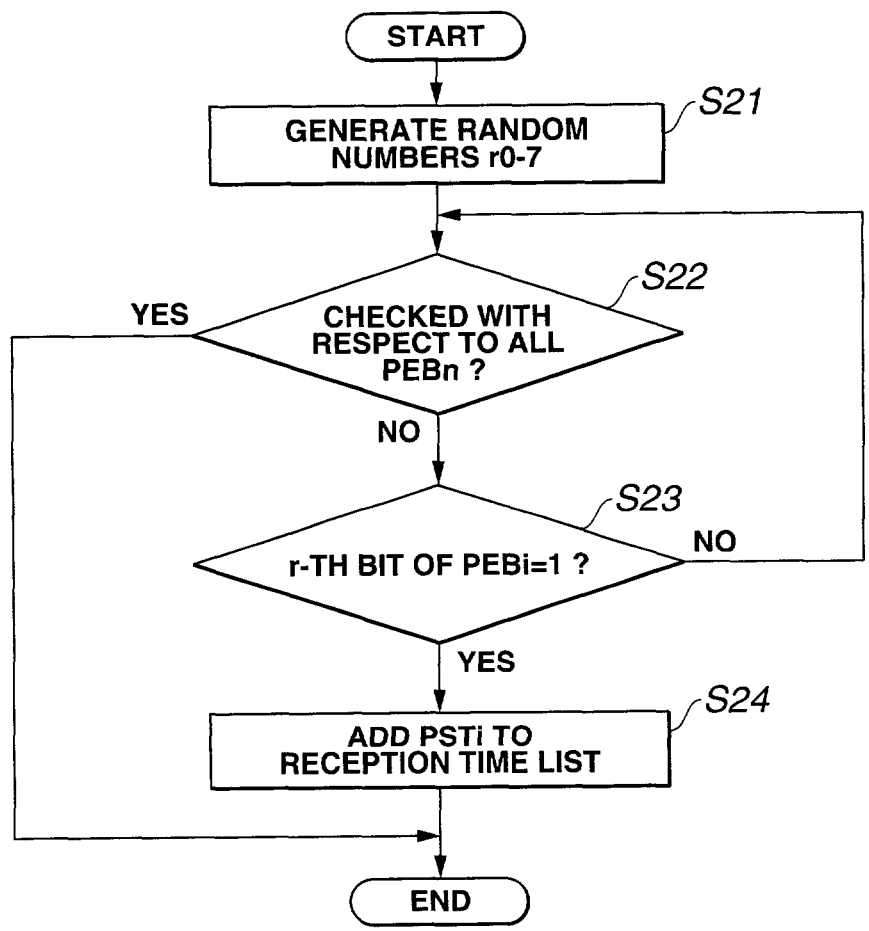
FIG. 28 is a flowchart showing the decision of the receiving operation time using random numbers.

As a specific example of the receiving operation time decision processing at step S12 of FIG. 27, the processing which uses random numbers will be described with reference to FIG. 28. FIG. 28 is a flowchart of the case where 8 bits are used as the PEB, the receiver generates random numbers of 0 to 7 in advance, and the receiving operation is carried out only at a fixed-time transmission time when on-state bit positions are coincident between the random number values and the PEB, as described with reference to FIG. 25.

First, at step S21, the reception control information generating section 107 generates random numbers r of 0 to 7. At steps S22 to S24, if the r-th bit is on (that is, 1) with respect to all PEBn of the received transmission time information, PSTi is added to the list RT as the receiving operation start time.

Figure 29:
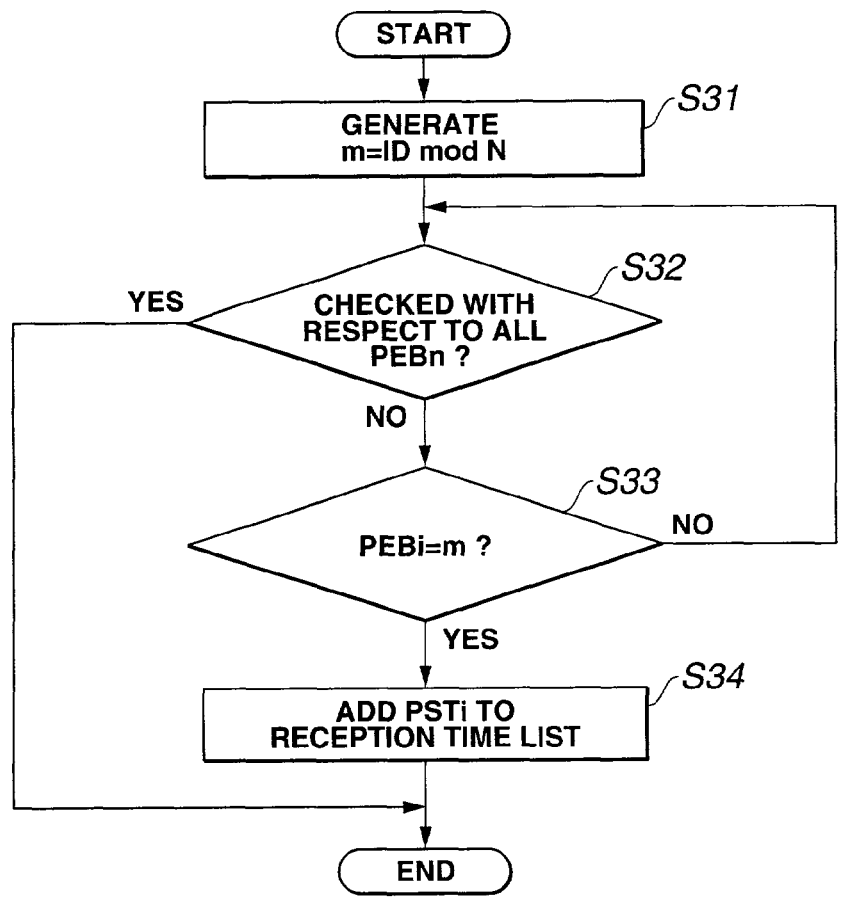
FIG. 29 is a flowchart showing the decision of the receiving operation time using the client ID (receiver IC card number).

FIG. 29 shows a flowchart for the decision of the receiving operation time by using the client ID (receiver IC card number), as another example of the receiving operation time decision processing. First, at step S31, the reception control information generating section 107 generates a value m of ID number modN. At steps S32 to S34, if PEBi is coincident with m with respect to all the PEBn of the received transmission time information, PSTi is added to the list RT as the receiving operation start time. By thus adding the information designating the receiver that should receive fixed-time transmission at that time, to the schedule information, and controlling so that only the designated receiver carries out the receiving operation, it is possible to control the operation of the receivers so as to prevent numerous receivers from simultaneously turning on the power at the time when fixed-time transmission is carried out.

A method for displaying the EPG of the receiving device which receives the EPG will now be described.

On the side of the broadcasting station, the data quantity itself tends to increase from now on because of the expectation to send as much program information as possible to users. On the side of the receiver, though it is necessary to increase the memory for the increased data quantity, the memory itself is becoming less expensive each year and the increase in the memory is easy in view of the cost. However, the transmission rate of the EPG information cannot be easily raised despite the increase of the information. Therefore, the transmission time is elongated accordingly and the time to enable display of the program table becomes much longer. Also, in view of the energy savings, it is considered that repeating continuous transmission of the same data is wasteful, and therefore it is proposed to limit the time for sending the EPG information as described above to a certain time period, then store the incoming information into the memory of the receiver, and use the data stored in the memory when displaying on the receiver side. In this case, the program table cannot be displayed on the receiver until the time period when the information is sent.

A technique for displaying the program information even in the case where the program information cannot be received because of troubles related to radio waves and cables or failure to turn on the power, or for some other reasons, will now be described.

In FIG. 8, the CPU 67 for carrying out the display processing of the EPG described in XML surmises what characteristics each program has. The result of surmise is stored together with the program information into a non-volatile memory (a memory connected to the CPU 67, though not shown).

In the case of multiplexing the EPG to the program image for display, if there is a program framework that has not received yet by the receiving device 50, the receiving device 50 finds out and displays a program which is likely to be broadcast in that time frame on the basis of the past information.

The CPU 67 detects the characteristics related to the broadcasting date and time of individual programs on the basis of the past program information stored in the non-volatile memory, then predicts the current or future program information that cannot be received at the time of fixed-time transmission of the EPG, and constructs and displays a program table on the display section.

Figure 30:
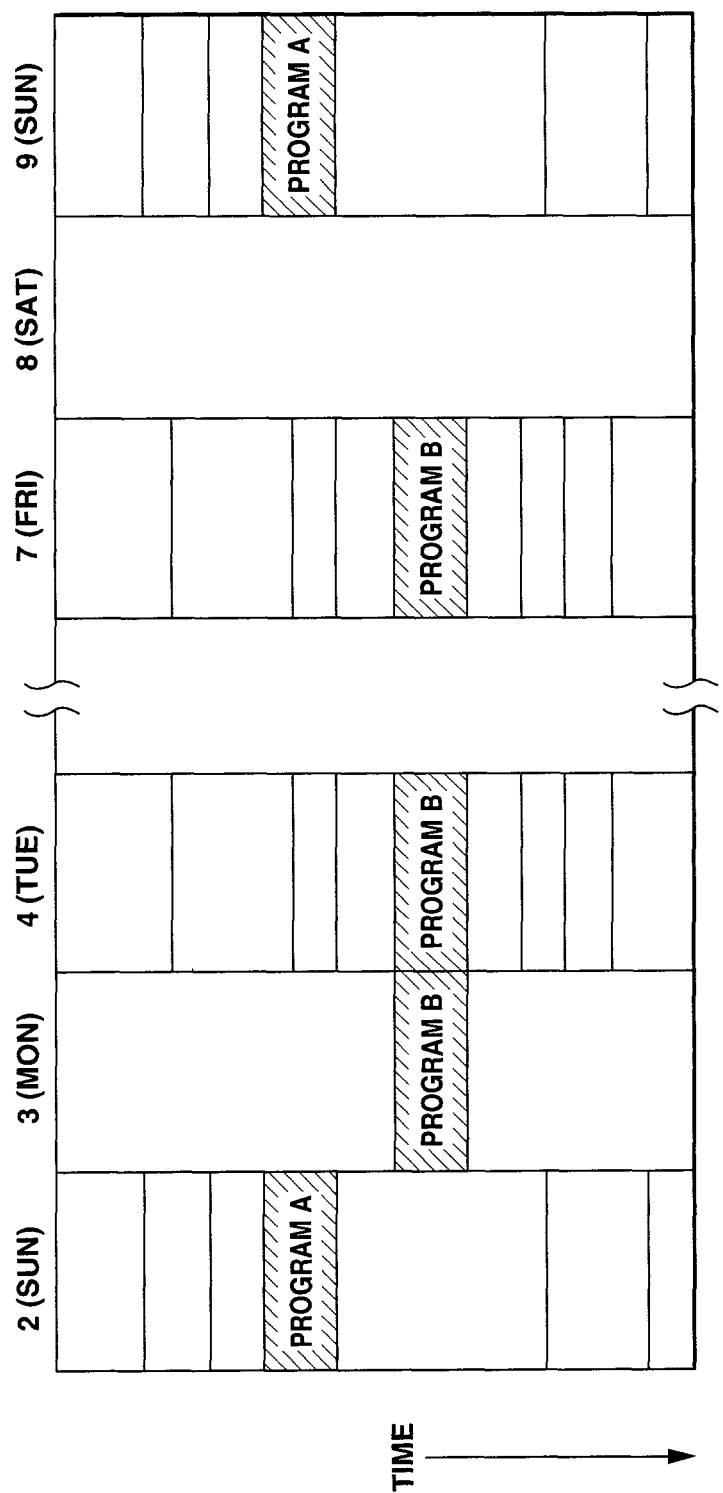
FIG. 30 shows a program table in which the horizontal axis represents the date and the vertical axis represents the time.
Figure 31:
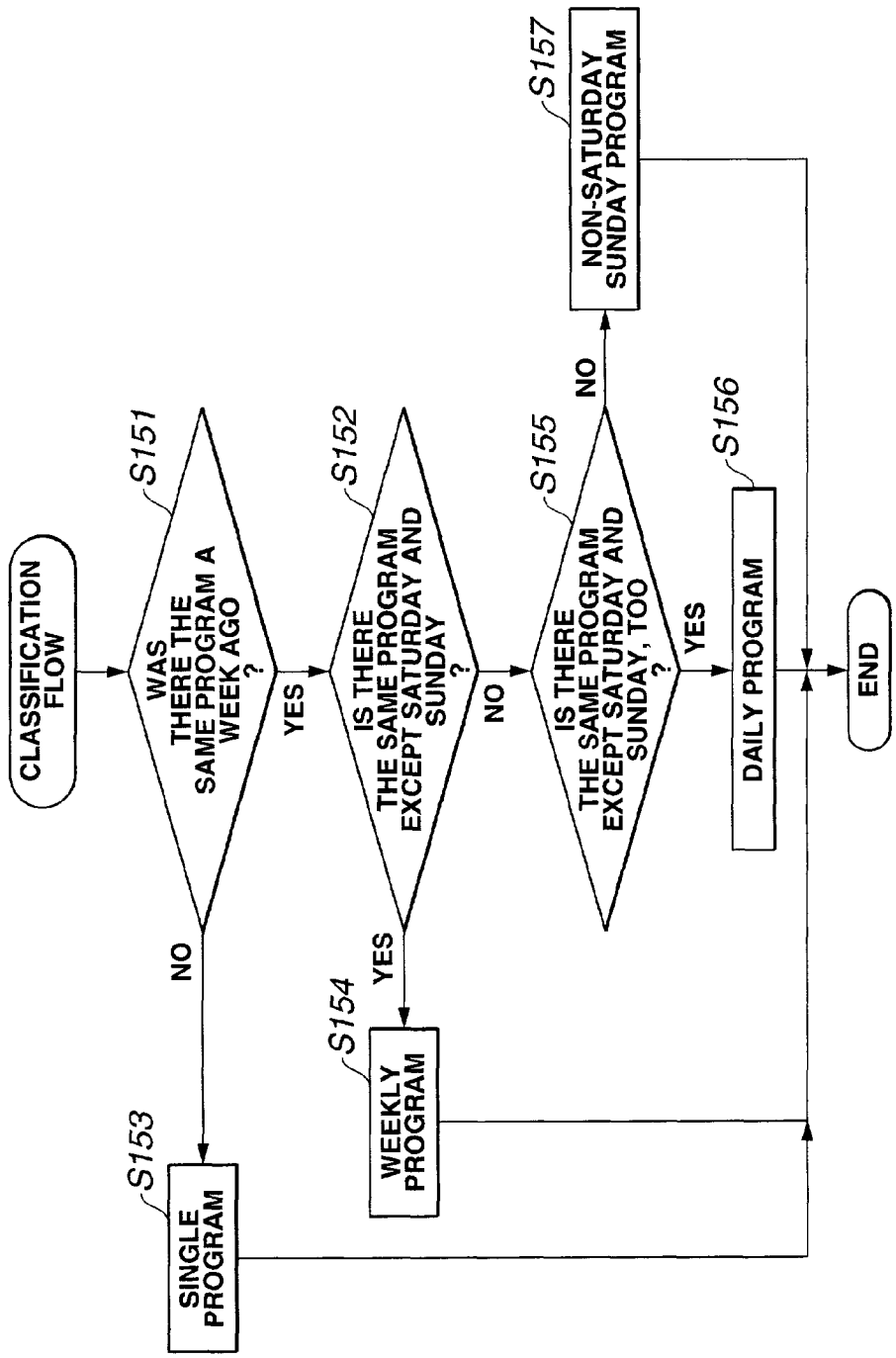
FIG. 31 is a flowchart showing the processing by the receiving device.

The operation which enables this prediction will be described with reference to FIGS. 30 and 31. FIG. 30 is a program table in which the horizontal axis represents the date and the vertical axis represents the time. It is written in the same manner as the television program section of an ordinary newspaper. FIG. 31 is a flowchart showing the processing by the receiving device.

In FIG. 31, at step S151, it is determined whether or not there was the same program a week ago. If there was the same program, the processing goes to step S152 to determine whether or not there is the same program except Saturday and Sunday. If it is determined at step S151 that there was not the same program a week ago, the processing goes to step S153 to determine that it is a single program. If it is determined at step S152 that there is the same program except Saturday and Sunday, the processing goes to step S154 to determine that it is a weekly broadcast program. If it is determined at step S152 that there is not the same program except Saturday and Sunday, the processing goes to step S155 to determine whether or not there is the same program on Saturday and Sunday, too. If it is determined that there is the same program on Saturday and Sunday, too, the processing goes to step S156 to determine that it is a daily program. On the other hand, if it is determined that there is not the same program on Saturday and Sunday, the processing goes to step S157 to determine that it is a program broadcast except Saturday and Sunday.

Referring to FIG. 30, for example, if there is a program A on Sunday, 2, and there is the program A also on Sunday, 9, it can be surmised that the program A is broadcast on every Sunday. Meanwhile, there is a program B on Monday, 3 through Friday, 7, it can be surmised that the program B is broadcast every day except Saturday and Sunday. Such program organization does not greatly change as a whole on the weekly basis. Therefore, it can be predicted that the program A will be broadcast at the same broadcast time next Sunday, 16, too, and that the program B will be broadcast on Monday, 10 through Friday, 14, too. Even if the information of the programs of this period is not obtained, a substantially accurate program table can be constructed. Thus, the program table can be constructed even without receiving the actual program table.

In the integrated EPG authoring PC 19 of FIG. 5, it is possible to include characteristic information such as daily broadcast, daily broadcast except Saturday and Sunday, weekly broadcast, and broadcast on the first Sunday of the month, into the EPG data. In this case, the receiving device receives the characteristic information, writes it to the non-volatile memory similarly to the result of surmise, and carries out similar processing.

By thus receiving the program information generated by the integrated EPG authoring PC 19, the receiving device can construct a program table even without receiving the actual program table. The program information predicted by the CPU 67 and the program information obtained by receiving fixed-time transmission may be discriminated by color in displaying on the display section.

Moreover, basic information of advertisement information appended to the program information to be broadcast may be stored in the non-volatile memory. In the non-volatile memory, advertisement information related to the program information may be stored together with the program information, as initial data at the time of shipment from the factory. Manual information related to the device may also be stored. By writing the whole program of broadcast and the program characteristics into the non-volatile memory at the time of shipment from the factory, the user can immediately see the program table, even several days after the shipment. That is, by storing the program of the same title that is repeatedly broadcast daily or weekly into the memory at the time of shipment from the factory of receivers, and later displaying such a program, it is possible to display the program table to a certain extent without receiving any data. As described above, the program information or advertisement information can be displayed and visually recognized by the user, even in the case where the program information or advertisement information cannot be received because of troubles related to radio waves and cables or failure to turn on the power, or for some other reasons.

A method for displaying advertisement information on the EPG will now be described. In the case of displaying advertisement information on the EPG described in XML, it is possible to dynamically display the corresponding advertisement in association with the program information on the basis of the conditions of the operation by the user and the time. An advertisement display technique will be described hereinafter.

As a method for displaying an advertisement on the EPG, it may be considered to display an advertisement matching the program or genre selected by the user, or to automatically display an advertisement when a preset time has come. The display of an advertisement matching the program table is already disclosed in "Information Transmission Method and Television Broadcasting Receiver (International Application Number: PCT/JP98/03707)", but it includes no example of advertisement data which enables setting of conditions to be displayed.

The format of advertisement data which enables setting of a plurality of conditions to be displayed is shown in FIG. 32. In FIG. 32, the respective characters have the following meanings.
AI: advertisement ID
ST: starting date and time when display of the advertisement becomes valid
ET: ending date and time when display of the advertisement becomes invalid
AN: name of the advertisement
AD: explanation of the advertisement
AP: URI of PNG or MNG appended to the advertisement
PA: are for displaying PNG or MNG (advertisement 1 or 2)
KT: type of next KV, channel number, time, etc.
KV: key value These advertisements can be set so that they are displayed when the receiver is in a specific state. Keys are used for a display condition. In this example, two keys can be set for one advertisement. The type of condition for displaying the advertisement is designated by KT, and the value of the key is set by KV.

Meanwhile, the format of the advertisement data is generated on the transmission side by using the advertisement information transmission method of the present invention. Specifically, the transmission side sets the condition for causing the receiving side to display the advertisement information in association with the program guide information, and transmits the advertisement information for which the condition is set and the program guide information. In the condition setting, the type of condition to be displayed on the receiving side and the value of the condition are set.

Also, the transmission side adds display time information for the receiving side to the advertisement information, and transmits the advertisement information to which the display time information is added. The display time information is compared with the present time on the receiving side, and when the display time information coincides with the present time, the advertisement information is displayed.

The receiver displays the advertisement information in association with the program guide information on the television screen. The structure and operation of the receiver will be described later.

FIG. 33 shows a specific example of the advertisement information having the format shown in FIG. 32.

Figure 34:
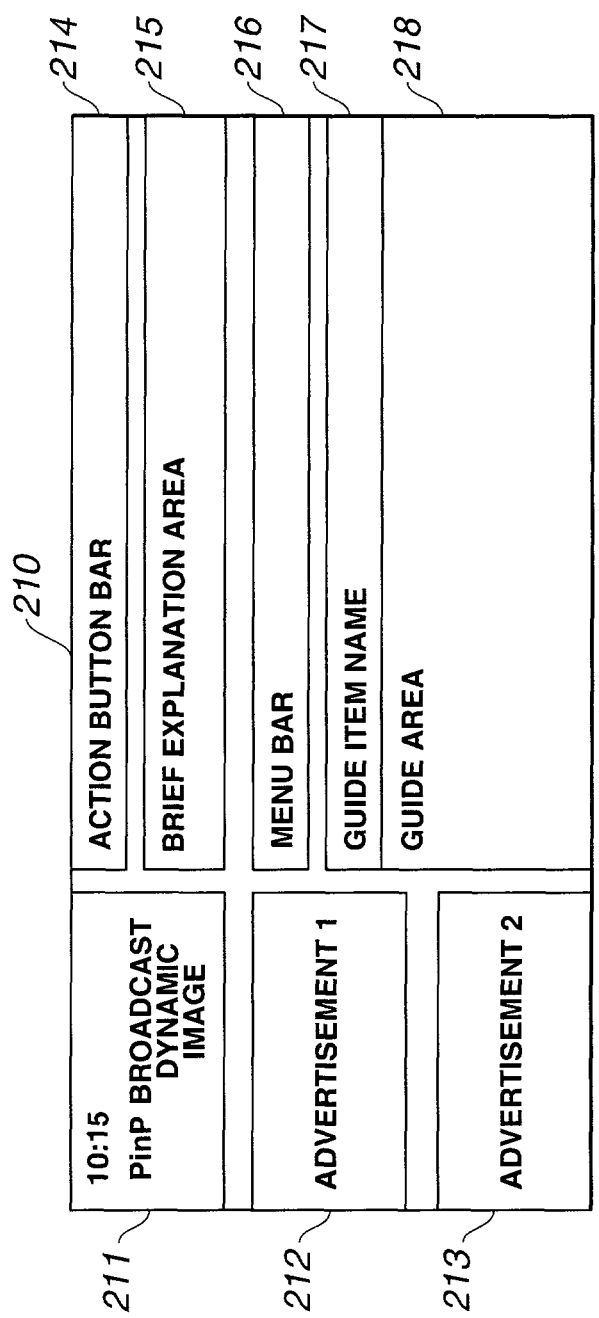
FIG. 34 shows the screen layout at the time when the receiver according to the present invention receives and displays the specific example of advertisement information shown in FIG. 33.

The screen layout in the case where the receiver, later described, receives and displays this specific example of the advertisement information is shown in FIG. 34. A screen 210 is divided into a PinP broadcast dynamic image area 211, an advertisement 1 area 212, an advertisement 2 area 213, an action button bar 214, a brief explanation area 215, a menu bar 216, a guide item name 217, and a guide area 218.

The PinP broadcast dynamic image area 211 displays dynamic images of real-time broadcast images of a station which is then selected. For example, it contracts the images to 32/128 for display. On the upper left part, the present time is displayed. As the mode for station selection, there are an automatic mode for automatically selecting a station in accordance with the focus in the guide area 218 and a locked mode which is not in accordance with the focus. The automatic mode is usually used.

In the advertisement 1 area 212 and the advertisement 2 area 213, the advertisement information is displayed as a static image in the PNG (portable network graphics) format or animation in the MNG (motion network graphics) format.

In the action button bar 214, various types of buttons are displayed depending on the state of the screen. In the brief description area 215, various types of text information are displayed depending on the state of the screen.

In the menu bar 216, various types of screen selection buttons are displayed depending on the state of the screen. Three buttons are simultaneously displayed, and by scrolling the buttons to the left and right, other buttons are also displayed. Specifically, buttons of "grid" for displaying grid-like EPG, "genre" for displaying genre sort EPG, "schedule" for displaying a reservation screen, "info" for displaying various types of information, "message" for displaying various types of messages, and "channel" for displaying a channel preset screen are displayed.

The guide item name 217 displays the name of an item in the guide area depending on the state of the screen. The guide area 218 displays various types of guides depending on the state of the screen.

Figure 35:
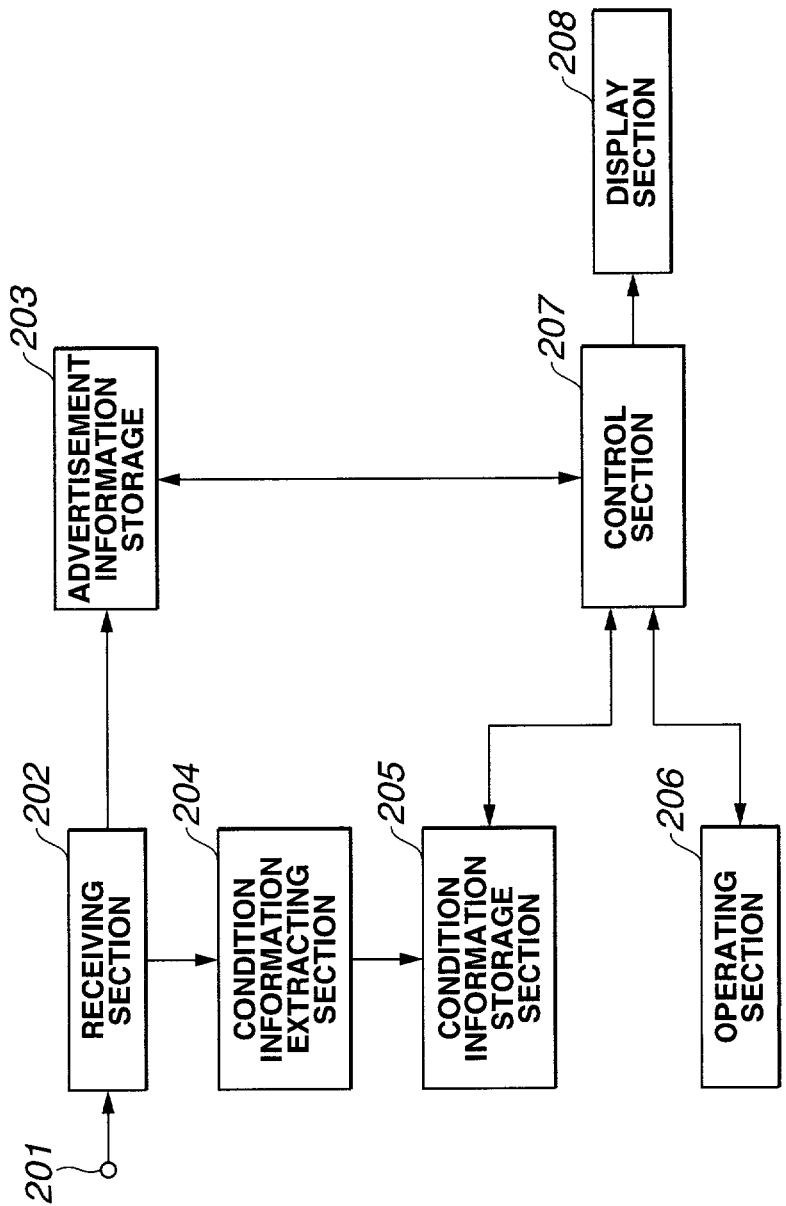
FIG. 35 is a block diagram showing the structure of a receiver which displays the advertisement information in association with the selection by the user in the program guide information.

A receiver which displays the advertisement information in association with the selection by the user with respect to the program guide information will now be described with reference to FIG. 35.

This receiver has a receiving section 202 for receiving program guide information and advertisement information associated with the program guide information which are transmitted from the transmission side. It has a condition information extracting section 204 for extracting condition information for displaying the advertisement information received by the receiving section 202. And it has a control section 207 for causing a display section 208 to display the advertisement information associated with an item selected from the program guide information by the user using an operating section 206, on the basis of the condition information extracted by the condition information extracting section 204. The advertisement information received by the receiving section 202 is stored in an advertisement information storage section 203. The control section 207 reads out the advertisement information associated with the item selected from the program guide information by the user using the operating section 206, from the advertisement information storage section 203, and causes the display section 208 to display the advertisement information on the basis of the condition information extracted by the condition information extracting section 204.

The condition information is information for selecting the program. The control section 207 causes the display section 208 to display the advertisement information associated with the program selected from the program guide information by the user using the operating section 206. The condition information may also be information for selecting the channel.

That is, the receiver capable of receiving and displaying the program guide information dynamically displays the associated advertisement on the basis of the selection of the program by the user. Also, the receiver dynamically displays the associated advertisement on the basis of the selection of the channel by the user.

The condition information may also be information for selecting the genre. The control section 207 may cause the display section 208 to display the advertisement associated with genre selected from the program guide information by the user.

Figure 36:
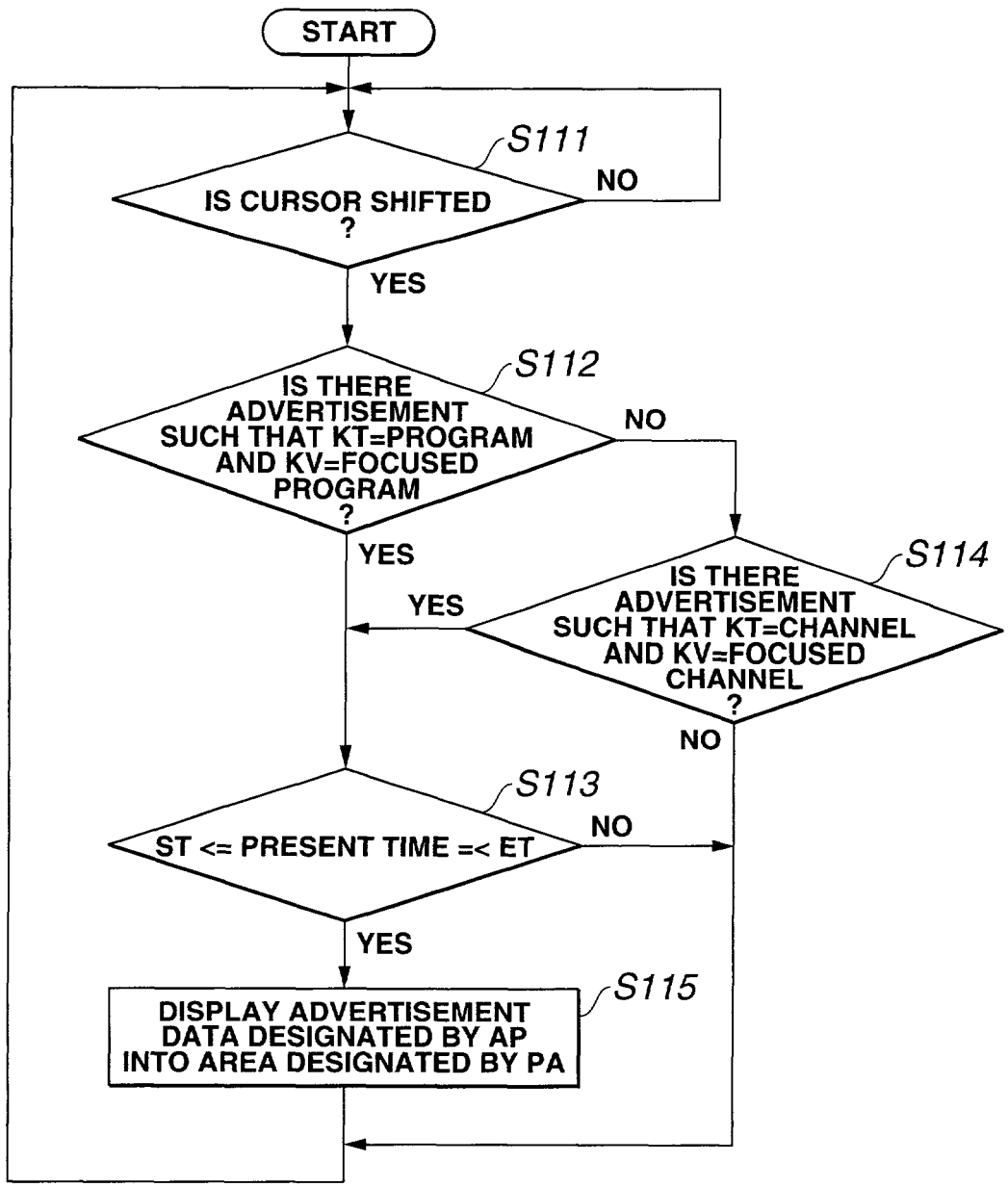
FIG. 36 is a flowchart showing the processing for displaying the advertisement information in association with the program or channel selected by the user.

The processing carried out by the receiver for displaying advertisement information in association with the program or channel selected by the user, on the screen 210 shown in FIG. 34 of the display section 208, is shown in FIG. 36.

First, if a cursor shifts in the guide area 218 at step S111, the processing goes to step S112 and it is determined whether or not there is an advertisement such that KT=program and KV=focused program, from the advertisement information shown in FIG. 33. If there is an advertisement for the program based on KT, KV, the processing goes to step S113 to determine whether or not the present time is within the time when the display of the advertisement is valid. If the present time is within the time when the display of the advertisement is valid, the processing goes to step S115 to display advertisement data designated by AP in an area designated by PA.

If there is no program based on KT, KV at step S112, the processing goes to step S114 and it is determined whether or not there is an advertisement such that KT=channel and KV=focused channel. If there is an advertisement for the channel based on KT, KV, the processing goes to step S113 to determine whether or not present time is within the time when the display of the advertisement is valid. If the present time is within the time when the display of the advertisement is valid, the processing goes to step S115 to display advertisement data designated by AP in an area designated by PA.

Figure 37A:
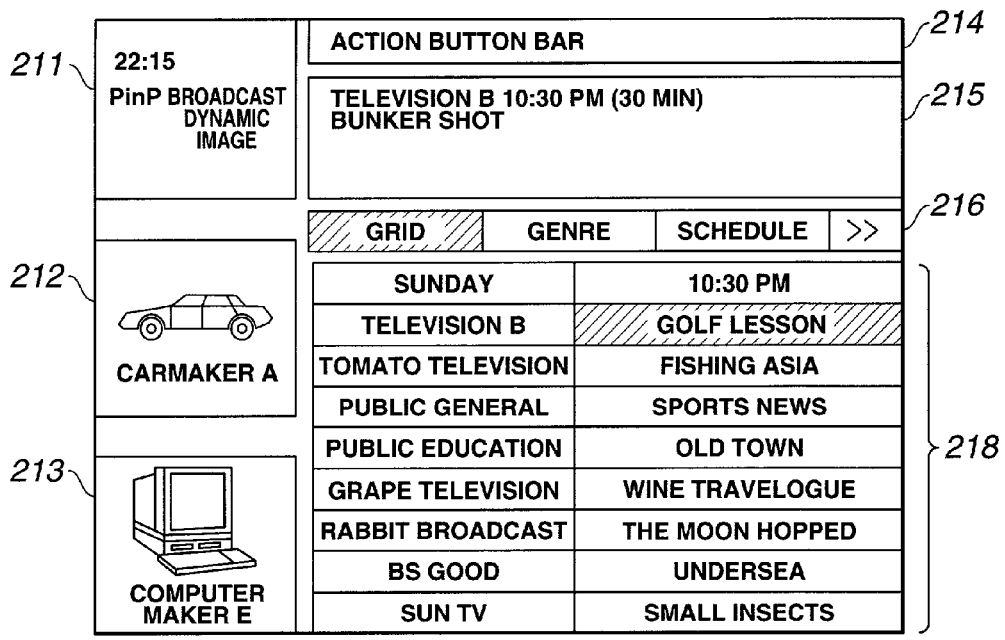
FIGS. 37A and 37B show a specific example of display in accordance with the processing shown in the flowchart of FIG. 36.
Figure 37B:
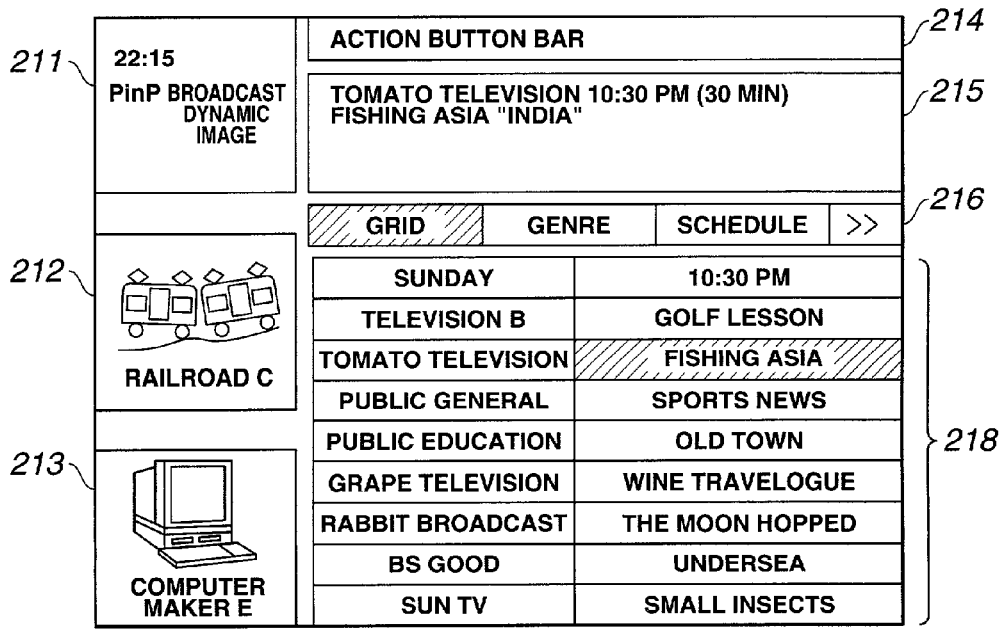

A specific example of the display based on the processing shown in the flowchart of FIG. 36 is shown in FIGS. 37A and 37B.

FIGS. 37A and 37B show an example of the display of the EPG in a grid-like form. In FIG. 37A, "Golf Lesson" of the channel "Television B" is focused. Thus, an advertisement of AI=1 such that KT is "channel" and KV is "Television B" is displayed in the advertisement 1 area (PA=1) 212. Since the present time is 22:15, an advertisement of AI=4 such that KT is "time" and KV is "8/1 22:00-8/1 23:00" is displayed in the advertisement 2 area (PA=2) 213.

When the user operates the remote controller and the focused program is shifted to "Fishing Asia" of the channel "Tomato Television" as shown in FIG. 38B, an advertisement of AI=2 such that KT is "program" and KV is "Fishing Asia" is displayed in the advertisement 1 area (PA=1) 212. Since the advertisement information of AI=2 is also designated for KV of "World Market", this advertisement is to be displayed also when the user selects "World Market".

Thus, it is possible to dynamically change the display of the advertisement in response to the operation by the user in the grid.

Figure 38:
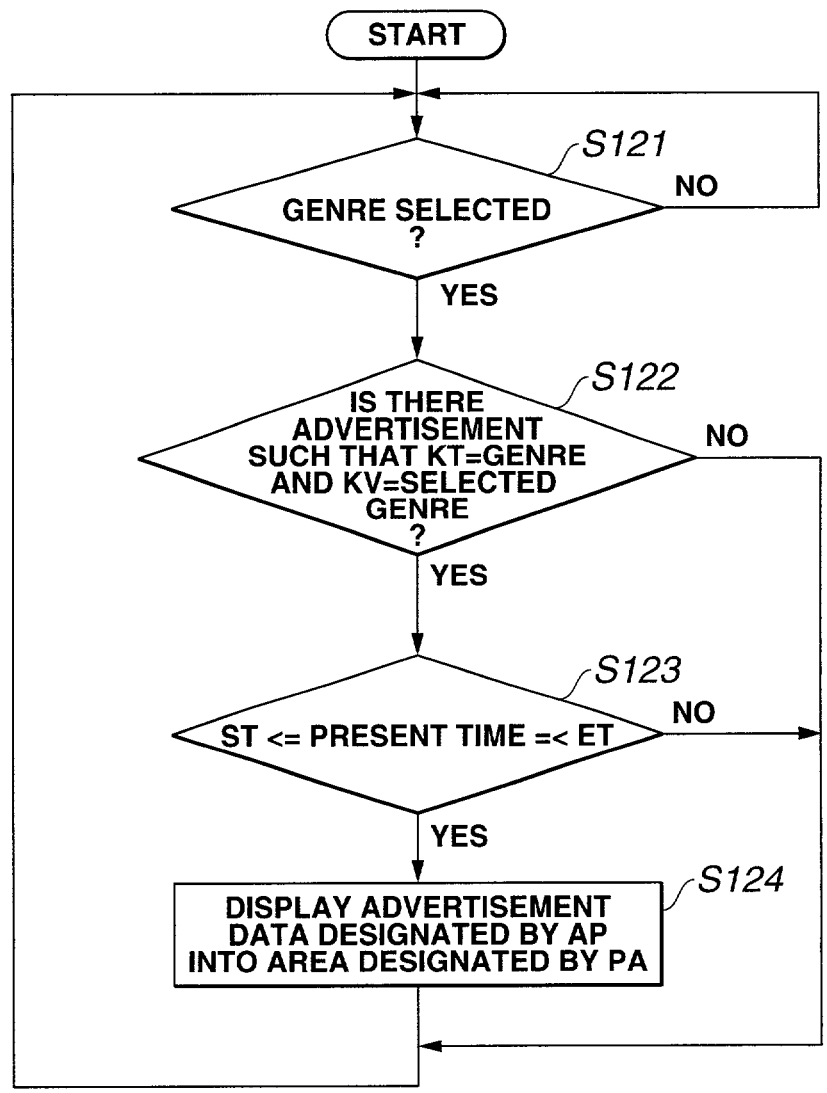
FIG. 38 is a flowchart showing the processing for displaying the advertisement information in association with the genre selected by the user.

The processing carried out by the receiver for displaying advertisement information in association with the genre selected by the user on the screen 210 shown in FIG. 34 is shown in FIG. 38.

First, if "genre" is selected in the menu bar 216 at step S121, the processing goes to step S122 and it is determined whether or not there is an advertisement such that KT=genre and KV=selected genre, from the advertisement information shown in FIG. 33. If there is an advertisement based on KT, KV, the processing goes to step S123 to determine whether or not the present time is within the time when the display of the advertisement is valid. If the present time is within the time when the display of the advertisement is valid, the processing goes to step S124 to display advertisement data designated by AP in an area designated by PA.

Figure 39:
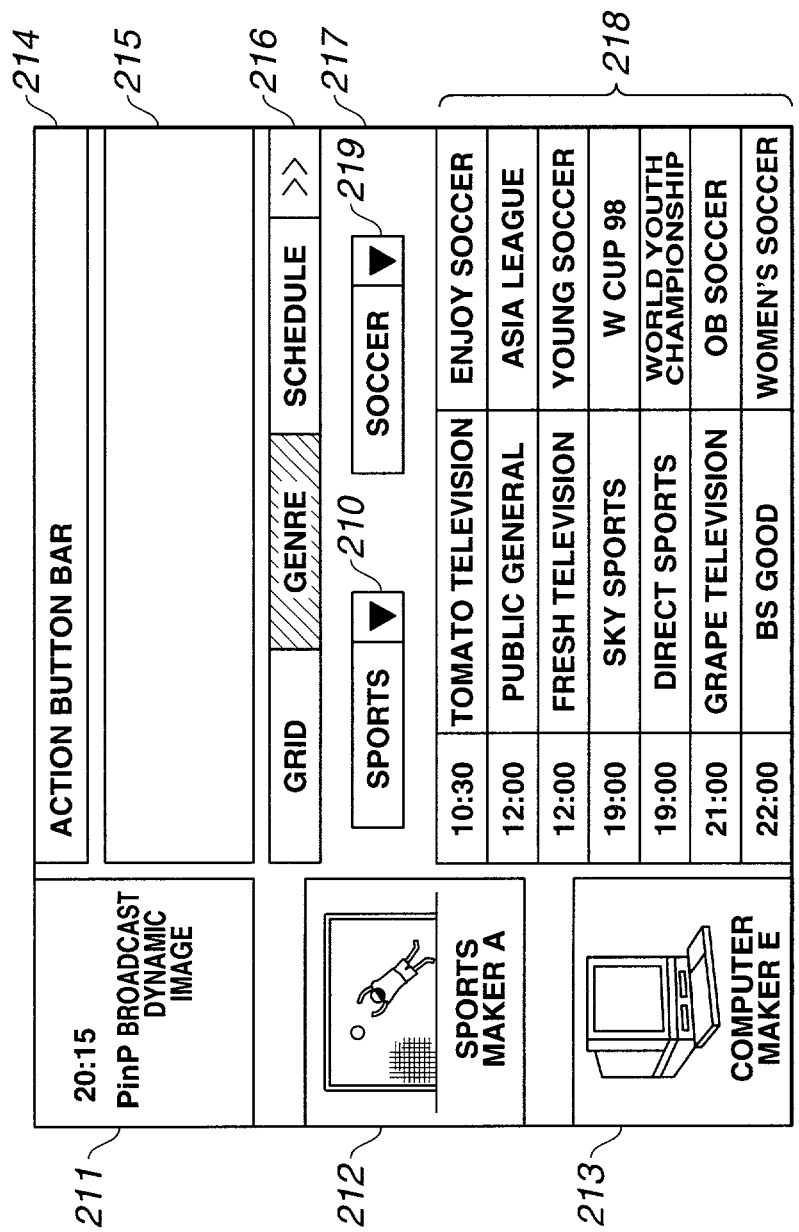
FIG. 39 shows a specific example of display in accordance with the processing shown in the flowchart of FIG. 38.

A specific example of the display based on the processing shown in the flowchart of FIG. 38 is shown in FIG. 39.

FIG. 39 shows an example of the display of the EPG based on the genre. It is considered to display a list of programs belonging to the selected genre. In FIG. 39, "soccer" of "sports" is selected as selection keys, and a list of related programs is displayed below the selection keys. In the case where the user selected "sports" and "soccer", an advertisement of AI=3 such that KT is "genre" and KV is "sports, soccer" is displayed in the advertisement 1 area (PA=1) 212. Since the advertisement information of AI=3 is also designated for KV of "sports, baseball", this advertisement is to be displayed also when the user selects "sports" and "baseball".

Thus, it is possible to dynamically change the display of the advertisement in response to the operation by the user in genre selection.

A receiver which displays the advertisement information in association with the lapse of time in the program guide information will now be described with reference to FIG. 40.

This receiver has a receiving section 222 for displaying advertisement information and display time information added to the advertisement information which are transmitted from the transmission side, a display time information extracting section 224 for extracting the display time information received by the receiving section 222, a display time information storage section 225 for storing the display time information extracted by the display time information extracting section 224, and a control section 228 for causing a display section 229 to display the advertisement information having the display time information added thereto if the present time coincides with the display time information stored in the display time information storage section 225. The advertisement information received by the receiving section 222 is stored in an advertisement information storage section 223. The display time stored in the display time information storage section 225 is compared with the present time from a clock 227 by a comparing section 226. When the display time and the present time coincide with each other, the comparing section 226 issues to the control section 228 the result to the effect that the display time and the present time are coincident. In accordance with the result of coincidence, the control section 228 takes out the advertisement information associated with the display time from the advertisement information storage section 223 and causes the display section 229 to display the advertisement information.

Figure 40:
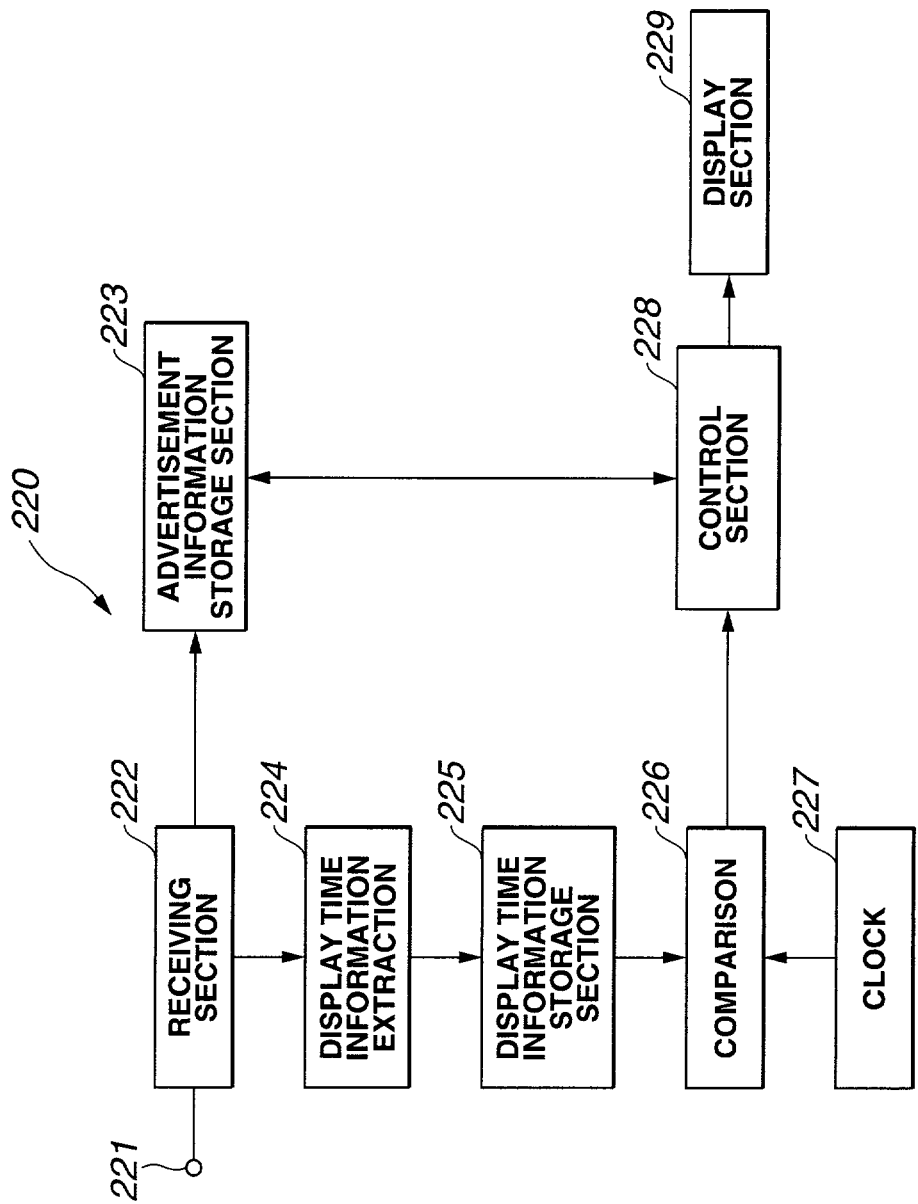
FIG. 40 is a block diagram showing a receiver which displays the advertisement information in association with the lapse of time in the program guide information.
Figure 41:
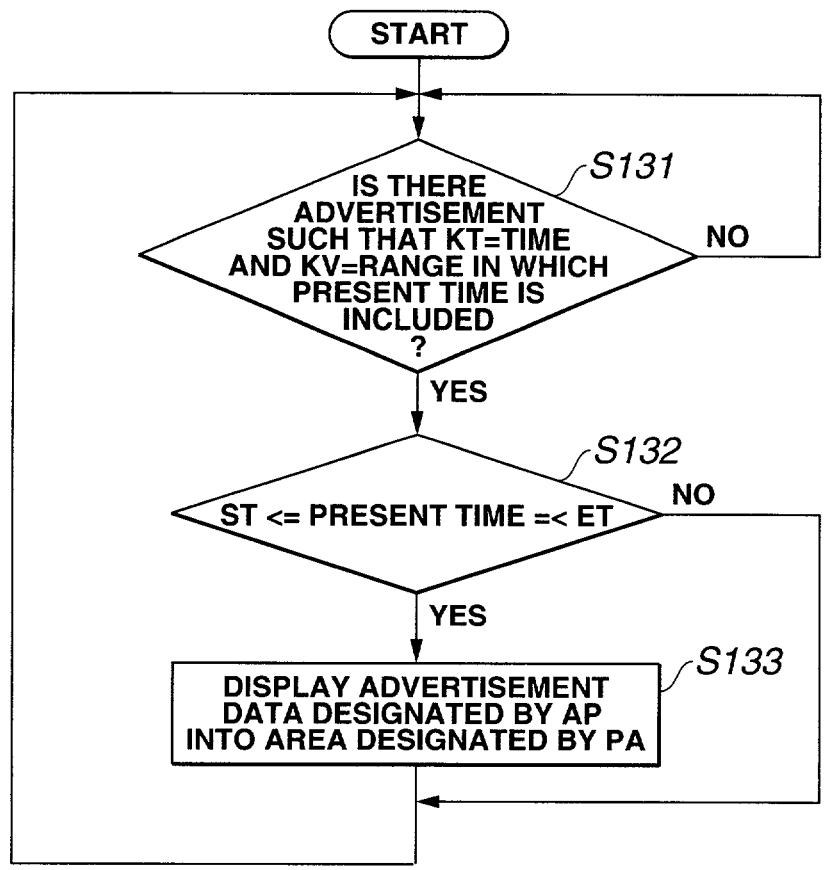
FIG. 41 is a flowchart showing the processing for displaying the advertisement information in association with the present time.

The processing carried out by the receiver for displaying advertisement information in association with the current time on the screen 210 of the display section 229 of FIG. 40 is shown in FIG. 41.

First, at step S131, it is determined from the advertisement information shown in FIG. 33 whether or not there is an advertisement such that KT=time and KV=a range in which the present time is included. If there is an advertisement at the time determined by KT, KV, the processing goes to step S132 to determine whether or not the present time is within the time when the display of the advertisement is valid. If the present time is within the time when the display of advertisement is valid, the processing goes to step S133 to display advertisement data designated by AP in an area designated by PA.

Figure 42A:
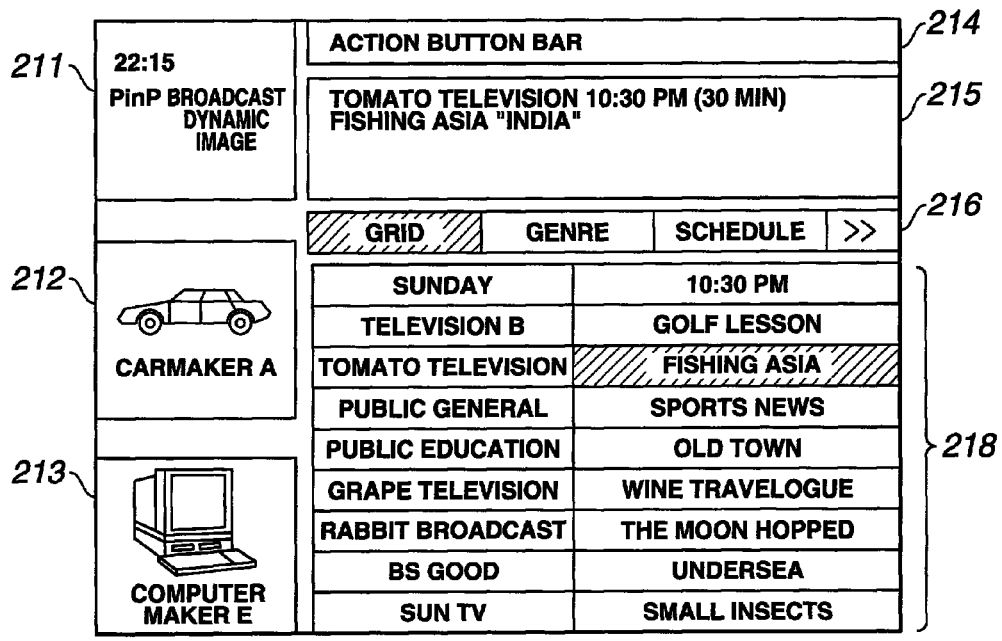
FIGS. 42A and 42B show a specific example of display in accordance with the processing shown in the flowchart of FIG. 41.
Figure 42B:
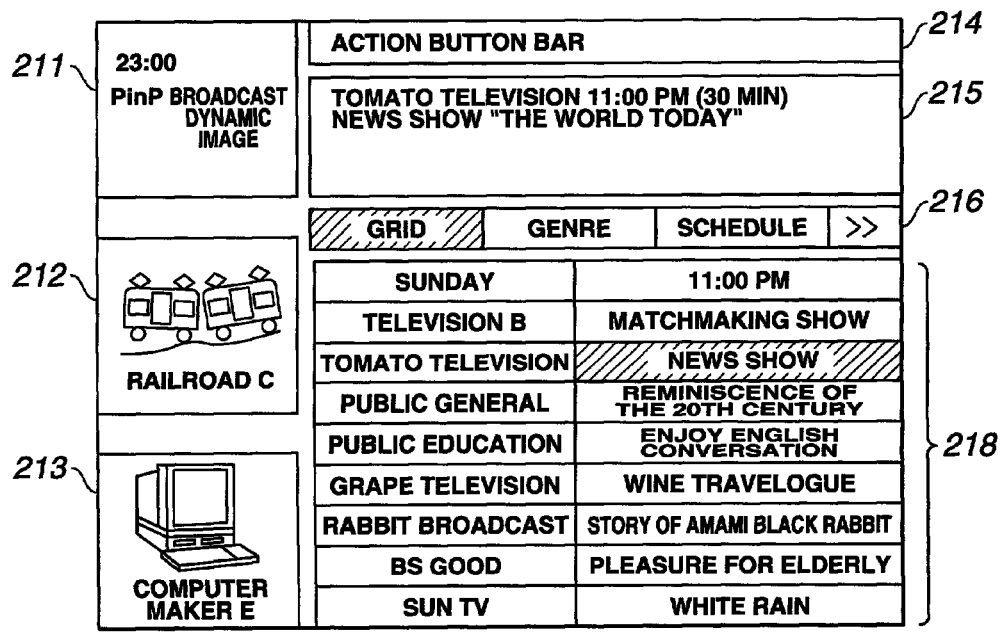

A specific example of the display based on the processing shown in the flowchart of FIG. 41 is shown in FIGS. 42A and 42B. An advertisement to be displayed at a preset time will be changed. In FIG. 42A, since the present time is 22:15, an advertisement of AI=4 such that KT is "time" and KV is "8/1 22:00-8/1 23:00" is displayed in the advertisement 2 area (PA=2) 213.

When the present time has become 23:00, an advertisement of AI=5 such that KT is "time" and KV is "8/1 23:00-8/2 0:00" is displayed in the advertisement 2 area (PA=2) 213, as shown in FIG. 42B. Since the advertisement of AI=5 also has KV="8/1 10:00-8/1 12:00", it was displayed in the advertisement 2 area 213 from 10:00 to 12:00.

Thus, it is possible to dynamically change the display of the advertisement on the basis of the preset time.

In the case where the advertisement data has such various types of display conditions (channel, program, genre, time and so on), conditions for displaying two advertisements in one advertisement area can be set. For example, if the display area for the advertisement of AI=4 is the advertisement 1 area (PA=1), it is possible that two advertisements are designated at a time in the advertisement 1 area. In such a case, in FIG. 37A, the advertisements of AI=1 and AI=4 are designated for display in the advertisement 1 area 212. In the case where a plurality of pieces of advertisement information are thus allocated in one advertisement area, a receiver which sequentially displays the advertisements may be considered. In this description, advertisement information that will not cause any overlap is used as an example.

The case of receiving digital satellite broadcast is described above. However, the present invention is also applicable to the case of realizing advertisement display in the broadcast where EPG is multiplexed, for example, ground wave broadcast or CATV. As described above, it is possible to dynamically display the corresponding advertisement in association with the program information on the basis of the conditions of the operation by the user and the time. Specifically, the advertisement associated with the program selected by the user can be dynamically displayed. Also, the advertisement associated with the genre selected by the user can be dynamically displayed. Moreover, the display of the advertisement can be dynamically changed at a designated time. Furthermore, a plurality of display conditions can be designated for one advertisement information. Also, in the receiver, a plurality of advertisements designated in one display area can be sequentially displayed.

As described above, according to the present invention, since EPG described in XML is transmitted, the display design transmission side (broadcasting station or contents producer) can determined the display design as well as character data, and images and sounds can be entered. With respect to the character data, since there is no limitation to the number of characters and non-standard characters, which are limited in the SI table format, the EPG information that is more advantageous to the user can be provided. For manufacturers of receiving devices, it suffices to develop only the software for receiving, decoding and displaying the received XML data, and there is no need to develop the software for displaying the EPG for each type of receiving device. Thus, the number of development steps can be reduced. Although the EPG information is described in XML in the embodiment, it is also possible to use languages such as HTML and Java, other than XML.

The invention claimed is:

1. A method for transmitting data from a broadcasting station to a first audio/video receiver made by a first manufacturer and a second audio/video receiver made by a second manufacturer which is different from the first manufacturer, the method comprising:
   obtaining advertisement information;
   generating program guide information representative of programs to be supplied to the receiver;
   generating a control signal; and
   transmitting the program guide information and the advertisement information to the receivers along with the control signal, said control signal operable to control a screen layout on a display of both the first audio/video receiver and the second audio/video receiver such that the advertisement information and the program guide information are displayed at the same relative locations on the display of both the first audio/video receiver and the second audio/video receiver,
   the program guide information being generated according to program guide information received from multiple broadcast systems and program guide information received from a non-broadcast source,
   the advertisement information including a multiple of keys associated with an advertisement, the keys defining at least one receiver state that will trigger display of the advertisement, and the keys including an indication of the type of condition for displaying the advertisement and an indication of the value of the condition for displaying the advertisement, the type of condition being at least one of a program, a channel and a time,
   display of the advertisement being triggered when the receiver state corresponds to at least the type of condition and the value of the condition, independent of any user preferences,
   when a plurality of advertisements are triggered for display at the same time in the same area of the display the advertisements are sequentially displayed,
   the advertisement and program guide information being displayed on a screen that includes a dynamic image area displaying dynamic images of real-time broadcast images of a selected station, the selected station being selected automatically based on a guide displayed in a guide area of the screen, and a menu bar displaying various types of screen selection buttons, the displayed buttons depending on the state of the screen, and
   the displayed advertisement information depending on a selection of an individual program in the guide area, whether or not a key associated with the advertisement indicates that the advertisement may be shown in connection with the individual program, and whether or not the time of selection of the individual program is within the time when the display of the advertisement is valid,
   wherein for each advertisement, the advertisement information includes an advertisement identification, a starting date and time when display of the advertisement becomes valid, an ending date and time when display of the advertisement becomes invalid, an advertisement name, an explanation of the advertisement, a uniform resource indicator of portable network graphics appended to the advertisement or motion network graphics appended to the advertisement, an indicator of an advertisement area for displaying portable network graphics or motion network graphics, at least one type key indicating the type of an associated value key, and at least one value key corresponding to respective ones of the at least one type key.

2. The transmission method as claimed in claim 1, wherein the control signal is described by a script.

3. The transmission method as claimed in claim 1, wherein the program guide information is described in extensible markup language.

4. The transmission method as claimed in claim 1, wherein the program guide information is transmitted in accordance with a carousel system.

5. The transmission method as claimed in claim 1, wherein the control signal is operable to control the screen layout by identifying the advertisement information to display together with the program guide information.

6. The transmission method of claim 5, wherein the advertisement information is associated with condition information operable to filter a portion of the advertisement information for displaying on the display device.

7. The transmission method as claimed in claim 1, wherein the program guide information includes program information of a plurality of different broadcasting systems.

8. The transmission method as claimed in claim 1, wherein at least a part of the program guide information is encrypted and then transmitted.

9. The transmission method as claimed in claim 1, wherein all the program guide information is transmitted a plurality of times a day, the program guide information including schedules of a plurality of programs, and when there is a change in the schedule of at least one of the programs, the program guide information of only at least one program is continuously transmitted.

10. The transmission method as claimed in claim 9, wherein a transmission schedule for transmitting all the program guide information is transmitted.

11. The transmission method of claim 1, wherein the control signal is operable to control the screen layout by identifying the program guide information to display.

12. The transmission method of claim 1, wherein the control signal is operable to control the screen layout by filtering content of the program guide information such that the display device only displays a portion of the program guide information transmitted.

13. The transmission method of claim 1, wherein the control signal is associated with condition information that is operable to select at least one of (i) programs, (ii) channels, (iii) genre or (iv) advertisements.

14. The transmission method of claim 1, wherein the program guide information further includes at least one of (i) a channel map, (ii) a program framework, (iii) program material or (iv) advertisement information.

15. A first receiving device made by a first manufacturer and a second receiving device made by a second manufacturer for receiving a broadcast signal including video and audio signals, program guide information including a control signal operable to control a screen layout on a display, and advertisement information, each of the receiving devices comprising:
   a receiving means for receiving the broadcast signal;
   an extracting means for extracting the program guide information from the broadcast signal; and
   a display processing means for carrying out display processing of a program guide based on the screen layout indicated by the control signal included in the program guide information such that the advertisement information and the program guide information are displayed at the same relative locations on the display of both the first receiving device and the second receiving device,
   the program guide information being generated according to program guide information received from multiple broadcast systems and program guide information received from a non-broadcast source,
   the advertisement information including a multiple of keys associated with an advertisement, the keys defining at least one receiver state that will trigger display of the advertisement, and the keys including an indication of the type of condition for displaying the advertisement and an indication of the value of the condition for displaying the advertisement, the type of condition being at least one of a program, a channel and a time,
   display of the advertisement being triggered when the receiver state corresponds to at least the type of condition and the value of the condition, independent of any user preferences,
   when a plurality of advertisements are triggered for display at the same time in the same area of the display the advertisements are sequentially displayed,
   the advertisement and program guide information being displayed on a screen that includes a dynamic image area displaying dynamic images of real-time broadcast images of a selected station, the selected station being selected automatically based on a guide displayed in a guide area of the screen, and a menu bar displaying various types of screen selection buttons, the displayed buttons depending on the state of the screen, and
   the displayed advertisement information depending on a selection of an individual program in the guide area, whether or not a key associated with the advertisement indicates that the advertisement may be shown in connection with the individual program, and whether or not the time of selection of the individual program is within the time when the display of the advertisement is valid,
   wherein for each advertisement, the advertisement information includes an advertisement identification, a starting date and time when display of the advertisement becomes valid, an ending date and time when display of the advertisement becomes invalid, an advertisement name, an explanation of the advertisement, a uniform resource indicator of portable network graphics appended to the advertisement or motion network graphics appended to the advertisement, an indicator of an advertisement area for displaying portable network graphics or motion network graphics, at least one type key indicating the type of an associated value key, and at least one type key indicating the type of an associated value key, and at least one value key corresponding to respective ones of the at least one type key.

16. The receiving device as claimed in claim 15, wherein the program guide information is transmitted in accordance with a carousel system, and the extracting means is operable to resolve a carousel structure of the carousel system.

17. The receiving device as claimed in claim 15, wherein the control signal is operable to control the screen layout by identifying the advertisement information to display together with the program guide information; and
   the display processing means carries out processing based on the control signal when displaying the advertisement information together with the program guide information.

18. The receiving device as claimed in claim 15, wherein at least a part of the program guide information is encrypted and then transmitted;
   the receiving device further comprising a decrypting means operable to decrypt the encrypted part of the program guide information.

19. The receiving device as claimed in claim 15, wherein all the program guide information is transmitted a plurality of times a day;
the receiving device further comprising a storage means for receiving and storing the program guide information when all the program guide information is transmitted.

20. The receiving device as claimed in claim 19, wherein a transmission schedule is included in the broadcast signal;
the receiving device further comprising a power control means for controlling a power source in accordance with the transmission schedule.

21. The receiving device as claimed in claim 15, further comprising a retrieval processing means operable to retrieve the program guide information received.

22. The receiving device of claim 21, wherein retrieval of the program guide information is based on user profile data.

23. The receiving device of claim 22, wherein the user profile data comprises at least one of: a genre preference; a message preference; an information preference; a personality preference; a one channel preference; a time preference; or a schedule preference.

24. The receiving device as claimed in claim 15, further comprising a non-volatile memory for storing an initial set of program guide information.

25. The receiving device of claim 24, wherein the initial set of program guide information is stored at a time of shipment from a factory.

26. The receiving device of claim 15, wherein the control signal is operable to control the screen layout by identifying the program guide information to display.

27. The receiving device of claim 15, wherein the extracting means applies condition information when extracting program guide information; and
the condition information is operable to select at least one of (i) programs, (ii) channels, (iii) genre or (iv) advertisements from the broadcast signal.

28. The receiving device of claim 27, wherein the condition information is set by a user of the receiving device, a broadcaster of the broadcast signal, or by a third party.

29. An apparatus, comprising:
a program table database operable to receive a plurality of television program tables;
at least one input operable to receive service information;
a change processor operable to identify changed program guide information from the program table database and the at least one input;
a table generator operable to generate current program guide information from the changed program guide information;
a processor operable to generate a control signal to control a screen layout on a display device that displays the current program guide information; and
a transmitter operable to transmit the program guide information and the control signal to a first receiver made by a first manufacturer and a second receiver made by a second manufacturer,
said control signal operable to control the display of the first receiver and the second receiver such that advertisement information and the program guide information are displayed at the same relative locations on the display of both the first receiver and the second receiver,
the program guide information being generated according to program guide information received from multiple broadcast systems and program guide information received from a non-broadcast source,
the advertisement information including a multiple of keys associated with an advertisement, the keys defining at least one receiver state that will trigger display of the advertisement, and the keys including an indication of the type of condition for displaying the advertisement and an indication of the value of the condition for displaying the advertisement, the type of condition being at least one of a program, a channel and a time,
display of the advertisement being triggered when the receiver state corresponds to at least the type of condition and the value of the condition, independent of any user preferences,
when a plurality of advertisements are triggered for display at the same time in the same area of the display the advertisements are sequentially displayed,
the advertisement and program guide information being displayed on a screen that includes a dynamic image area displaying dynamic images of real-time broadcast images of a selected station, the selected station being selected automatically based on a guide displayed in a guide area of the screen, and a menu bar displaying various types of screen selection buttons, the displayed buttons depending on the state of the screen, and
the displayed advertisement information depending on a selection of an individual program in the guide area, whether or not a key associated with the advertisement indicates that the advertisement may be shown in connection with the individual program, and whether or not the time of selection of the individual program is within the time when the display of the advertisement is valid,
wherein for each advertisement, the advertisement information includes an advertisement identification, a starting date and time when display of the advertisement becomes valid, an ending date and time when display of the advertisement becomes invalid, an advertisement name, an explanation of the advertisement, a uniform resource indicator of portable network graphics appended to the advertisement or motion network graphics appended to the advertisement, an indicator of an advertisement area for displaying portable network graphics or motion network graphics, at least one type key indicating the type of an associated value key, and at least one value key corresponding to respective ones of the at least one type key.

* * * * *

UNITED STATES PATENT AND TRADEMARK OFFICE
CERTIFICATE OF CORRECTION

PATENT NO.         : 8,418,203 B1                         Page 1 of 1
APPLICATION NO.    : 09/807804
DATED              : April 9, 2013
INVENTOR(S)        : Fumihiko Nishio It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 677 days.

Signed and Sealed this
Fourteenth Day of May, 2013

Teresa Stanek Rea
*Acting Director of the United States Patent and Trademark Office*